(12) United States Patent
Lee

(10) Patent No.: US 8,674,750 B2
(45) Date of Patent: Mar. 18, 2014

(54) CHARGE PUMP, A METHOD FOR CONTROLLING THE SAME, AND A DISPLAY DRIVING SYSTEM COMPRISING THE CHARGE PUMP

(75) Inventor: Jae-youn Lee, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 300 days.

(21) Appl. No.: 13/053,750

(22) Filed: Mar. 22, 2011

(65) Prior Publication Data

US 2011/0234652 A1 Sep. 29, 2011

(30) Foreign Application Priority Data

Mar. 23, 2010 (KR) ........................ 10-2010-0025876

(51) Int. Cl.
*G05F 1/10* (2006.01)
(52) U.S. Cl.
USPC ............................................. 327/536
(58) Field of Classification Search
USPC ................................ 327/535, 536, 537
See application file for complete search history.

(56) References Cited

U.S. PATENT DOCUMENTS

| | | | | |
|---|---|---|---|---|
| 6,307,425 B1 * | 10/2001 | Chevallier et al. | ............ | 327/536 |
| 6,545,529 B2 * | 4/2003 | Kim | ................ | 327/536 |
| 6,933,768 B2 * | 8/2005 | Hausmann | ................ | 327/536 |
| 7,116,154 B2 * | 10/2006 | Guo | ................ | 327/536 |
| 7,282,985 B2 * | 10/2007 | Yen et al. | ................ | 327/536 |
| 7,365,592 B2 * | 4/2008 | Hirayama | ................ | 327/536 |
| 7,439,793 B2 * | 10/2008 | Lee | ................ | 327/536 |
| 7,994,844 B2 * | 8/2011 | Chen et al. | ................ | 327/536 |
| 8,294,509 B2 * | 10/2012 | Pan et al. | ................ | 327/536 |
| 8,339,183 B2 * | 12/2012 | Htoo et al. | ................ | 327/536 |

FOREIGN PATENT DOCUMENTS

| | | |
|---|---|---|
| JP | 2007-036215 A | 2/2007 |
| JP | 2007-202389 A | 8/2007 |
| KR | 10-0366636 B1 | 1/2003 |

* cited by examiner

*Primary Examiner* — Jeffrey Zweizig
(74) *Attorney, Agent, or Firm* — Harness, Dickey & Pierce, PLC

(57) ABSTRACT

Disclosed is a charge pump and a method of controlling the charge pump. The charge pump including a charge pumping unit to boost a first voltage in response to a clock signal, the first voltage being boosted to a second voltage having a voltage level higher than the first voltage by a middle voltage, the middle voltage being generated in response to a first control signal, the first control signal being enabled during a time period in which the clock signal and a second control signal are disabled. The charge pumping unit boosts the second voltage to a third voltage, the third voltage being a voltage level higher than an input voltage by the first voltage, the input voltage being generated in response to the second control signal. The charge pump includes a first transfer unit to output the third voltage in response to the second control signal.

10 Claims, 17 Drawing Sheets

CHARGE PUMP, A METHOD FOR CONTROLLING THE SAME, AND A DISPLAY DRIVING SYSTEM COMPRISING THE CHARGE PUMP

CROSS-REFERENCE TO RELATED APPLICATIONS

This application claims priority under 35 U.S.C. §119 to Korean Patent Application No. 10-2010-0025876, filed on Mar. 23, 2010, in the Korean Intellectual Property Office (KIPO), the disclosure of which is incorporated herein in its entirety by reference.

BACKGROUND

1. Field

Example embodiments of inventive concepts relate to a boosting voltage generation technique, and more particularly, to a charge pump for use in semiconductor integrated circuits, a method of controlling the charge pump, and a display driving system including the charge pump.

2. Description of the Related Art

Display driver integrated circuits (ICs) (DDIs) for driving a mobile thin film transistor (TFT) liquid crystal display (LCD) consume low power and have few exterior components. Most of the exterior components of a DDI are flying capacitors and storage capacitors of a charge pump used for voltage conversion. There have been attempts to increase the price competitiveness of LCD modules by building the flying capacitors and the storage capacitors in a DDI or removing them. Because there is a limit to the size of a flying capacitor in a DDI, a required current is provided by increasing the switching frequency of a charge pump. This causes switching losses to increase, leading to an increase in power consumption.

SUMMARY

Example embodiments of inventive concepts provide a charge pump having an improved current driving capability by minimizing or reducing unnecessary power consumption.

According to example embodiments of inventive concepts, provided is a charge pump including a charge pumping unit configured to boost a first voltage in response to a clock signal, the first voltage being boosted to a second voltage having a voltage level higher than the first voltage by a middle voltage, the middle voltage being generated in response to a first control signal, the first control signal being enabled during a time period in which the clock signal and a second control signal are disabled. The charge pumping unit is configured to boost the second voltage to a third voltage, the third voltage being a voltage level higher than an input voltage by the first voltage, the input voltage being generated in response to the second control signal. The charge pump includes a first transfer unit configured to output the third voltage in response to the second control signal.

According to example embodiments of inventive concepts, provided is a charge pump including a charge pumping unit which performs a first boosting operation of boosting a voltage of a boost node, which is a first voltage, in response to a clock signal to a second voltage having a voltage level higher than the first voltage by a middle voltage, in response to a first control signal, and performs a second boosting operation of boosting the second voltage of the boost node to a third voltage having a voltage level higher than an input voltage by the first voltage in response to a second control signal; and a first transfer unit which outputs the third voltage in response to the second control signal, wherein the first control signal is enabled in a non-overlap section in which the clock signal and the second control signal are disabled.

The charge pumping unit may perform a first initialization operation of initializing the voltage of the boost node from the third voltage to the second voltage in response to the first control signal and performs a second initialization operation of initializing the voltage of the boost node from the second voltage to the first voltage in response to the clock signal.

The second voltage may have a voltage level between the first voltage and the third voltage.

The clock signal and the second control signal may have different duty ratios so that level transition sections of the clock signal are not overlapped by level transition sections of the second control signal.

The charge pumping unit may include a second transfer unit which transfers the middle voltage in response to the first control signal in the first boosting operation and a first initialization operation; and a third transfer unit which transfers the first voltage to the boost node in response to the clock signal in a second initialization operation.

According to an embodiment of the inventive concept, the charge pumping unit may include a pumping capacitor connected between an input node and the boost node. The input node may include a first end connected to a ground voltage and a second end connected to the input voltage, and the boost node may include a first end connected to an output unit and a second end connected to a power supply voltage source. The first transfer unit may include a first switch which transfers the input voltage to the input node in response to the second control signal; and a second switch which transfers the third voltage to the output unit in response to the second control signal. The second transfer unit may include a middle voltage application switch which applies the middle voltage to between the pumping capacitor and the input node in response to the first control signal. The third transfer unit may include a third switch which transfers a power supply voltage to the boost node in response to the clock signal, and a fourth switch which connects the input node to a ground terminal. For example, the input voltage and the first voltage may be power supply voltages.

According to another embodiment of the inventive concept, the charge pumping unit may include a pumping capacitor connected between an input node and the boost node. The input node may include a first end connected to a power supply voltage source and a second end connected to the input voltage, and the boost node may include a first end connected to an output unit and a second end connected to a ground voltage. The first transfer unit may include a first switch which transfers the input voltage to the input node in response to the second control signal; and a second switch which transfers the third voltage to the output unit in response to the second control signal. The second transfer unit may include a middle voltage application switch which applies the middle voltage to between the pumping capacitor and the input node in response to the first control signal. The third transfer unit may include a fourth switch which transfers the ground voltage to the boost node in response to the clock signal, and a third switch which connects the input node to the first voltage. For example, the input voltage and the first voltage may be ground voltages.

The output unit may include an output capacitor between an output terminal and a ground terminal.

A parasitic capacitance may be generated between the pumping capacitor and the input node, or between the pumping capacitor and the output node, or both between the pumping capacitor and the input node and between the pumping capacitor and the output node.

A plurality of the middle voltage application switches for applying the middle voltage may be included.

According to another aspect of the inventive concept, there is provided a charge pump including a first unit charge pump; and a second unit charge pump which uses an output voltage of the first unit charge pump as an input voltage. Each of the first and second unit charge pumps may include a charge pumping unit which performs a first boosting operation of boosting a voltage of a boost node, which is a first voltage, in response to a clock signal to a second voltage having a voltage level higher than the first voltage by a middle voltage, in response to a first control signal, and performs a second boosting operation of boosting the second voltage of the boost node to a third voltage having a voltage level higher than an input voltage by the first voltage in response to a second control signal; and a first transfer unit which outputs the third voltage in response to the second control signal.

For example, the first control signal may be enabled in a non-overlap section in which the clock signal and the second control signal are disabled.

According to another aspect of the inventive concept, there is provided a display driving system including a display panel in which a plurality of scan lines perpendicularly intersect with a plurality of data lines and a switching units and a pixel electrode are disposed at each of the intersections; a scan driving unit which applies scan signals to the plurality of scan lines of the display panel; a data driving unit which applies grayscale information to the plurality of data lines of the display panel; a timing controller which controls the scan driving unit and the data driving unit; and at least one charge pump which applies a driving voltage to at least one selected from the group consisting of the display panel, the scan driving unit, the data driving unit, and the timing controller.

For example, the charge pump may be the above-described charge pump, including a charge pumping unit which performs a first boosting operation of boosting a voltage of a boost node, which is a first voltage, in response to a clock signal to a second voltage having a voltage level higher than the first voltage by a middle voltage, in response to a first control signal, and performs a second boosting operation of boosting the second voltage of the boost node to a third voltage having a voltage level higher than an input voltage by the first voltage in response to a second control signal; and a first transfer unit which outputs the third voltage in response to the second control signal, wherein the first control signal is enabled in a non-overlap section in which the clock signal and the second control signal are disabled.

According to another aspect of the inventive concept, there is provided a method of controlling a charge pump, the method including: a first boosting operation of boosting a voltage of a boost node, which is a first voltage, in response to a clock signal to a second voltage having a voltage level higher than the first voltage by a middle voltage, in response to a first control signal; a second boosting operation of boosting the second voltage of the boost node to a third voltage having a voltage level higher than an input voltage by the first voltage in response to a second control signal; and an operation of outputting the third voltage in response to the second control signal, wherein the first control signal is enabled in a non-overlap section in which the clock signal and the second control signal are disabled.

The method may further include a first initialization operation of initializing the voltage of the boost node from the third voltage to the second voltage in response to the first control signal; and a second initialization operation of initializing the voltage of the boost node from the second voltage to the first voltage in response to the clock signal.

The clock signal and the second control signal may have different duty ratios so that level transition sections of the clock signal are not overlapped by level transition sections of the second control signal.

The second voltage may have a voltage level between the first voltage and the third voltage.

BRIEF DESCRIPTION OF THE DRAWINGS

Example embodiments of inventive concepts will be more clearly understood from the following brief description taken in conjunction with the accompanying drawings. FIGS. 1-10 represent non-limiting, example embodiments as described herein.

FIG. 7 is a circuit diagram illustrating a second transfer unit according to example embodiments of inventive concepts.

FIG. 8 is a timing diagram illustrating a detailed operation of the positive charge pump illustrated in FIG. 1A when the second transfer unit illustrated in FIG. 7 is used.

FIG. 9 is a block diagram illustrating a display driving system according to example embodiments of inventive concepts.

FIG. 10 is a flowchart illustrating a method of controlling a charge pump, according to example embodiments of inventive concepts.

Figure 1A:
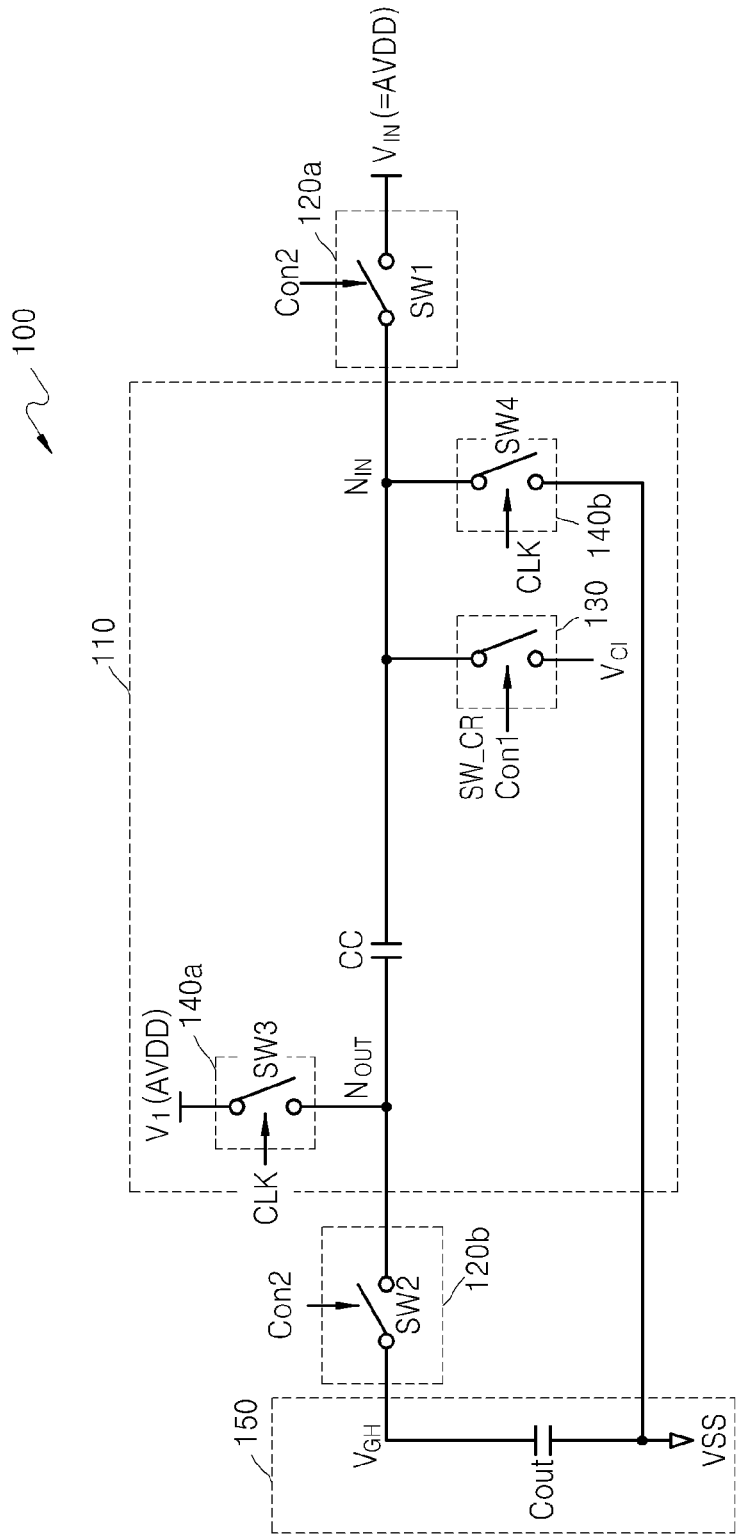
FIG. 1A is a circuit diagram of a positive charge pump according to example embodiments of inventive concepts.

It should be noted that these Figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the relative thicknesses and positioning of molecules, layers, regions and/or structural elements may be reduced or exaggerated for clarity. The use of similar or identical reference numbers in the various drawings is intended to indicate the presence of a similar or identical element or feature.

DETAILED DESCRIPTION OF EXAMPLE EMBODIMENTS

Example embodiments will now be described more fully with reference to the accompanying drawings, in which example embodiments are shown. Example embodiments may, however, be embodied in many different forms and should not be construed as being limited to the embodiments set forth herein; rather, these embodiments are provided so that this disclosure will be thorough and complete, and will fully convey the concept of example embodiments to those of ordinary skill in the art. In the drawings, the thicknesses of layers and regions are exaggerated for clarity. Like reference numerals in the drawings denote like elements, and thus their description will be omitted.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Like numbers indicate like elements throughout. As used herein the term "and/or" includes any and all combinations of one or more of the associated listed items.

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises", "comprising", "includes" and/or "including," if used herein, specify the presence of stated features, integers, steps, operations, elements and/or components, but do not preclude the presence or addition of one or more other features, integers, steps, operations, elements, components and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle may have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Figure 1B:
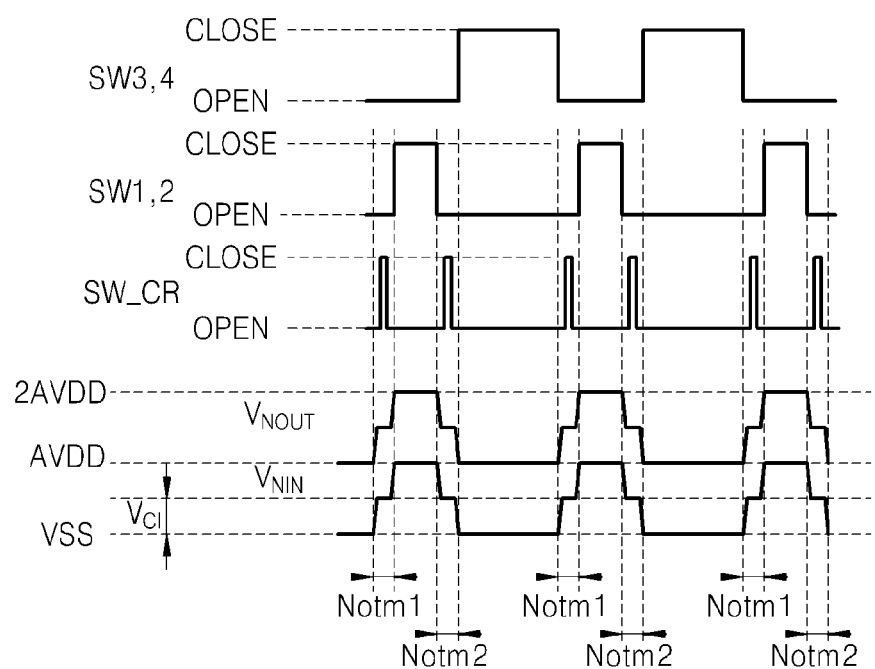
FIG. 1B is a timing diagram illustrating a detailed operation of the positive charge pump illustrated in FIG. 1A according to example embodiments.

FIG. 1A is a circuit diagram illustrating a positive charge pump 100 according to example embodiments of inventive concepts. FIG. 1B is a timing diagram illustrating a detailed operation of the positive charge pump 100.

Figure 2A:
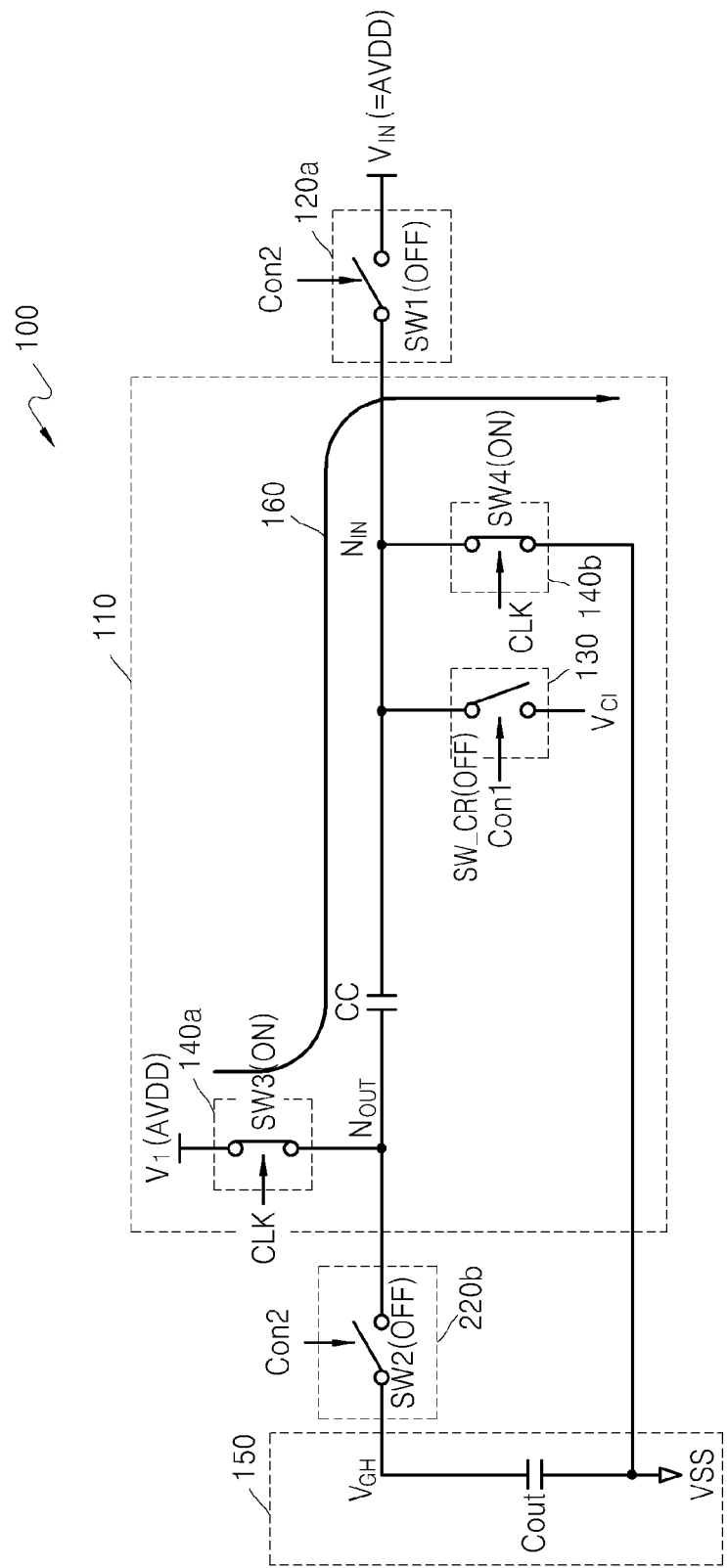
FIGS. 2A, 2B, and 2C are circuit diagrams illustrating operational states of the positive charge pump illustrated in FIG. 1A.
Figure 2B:
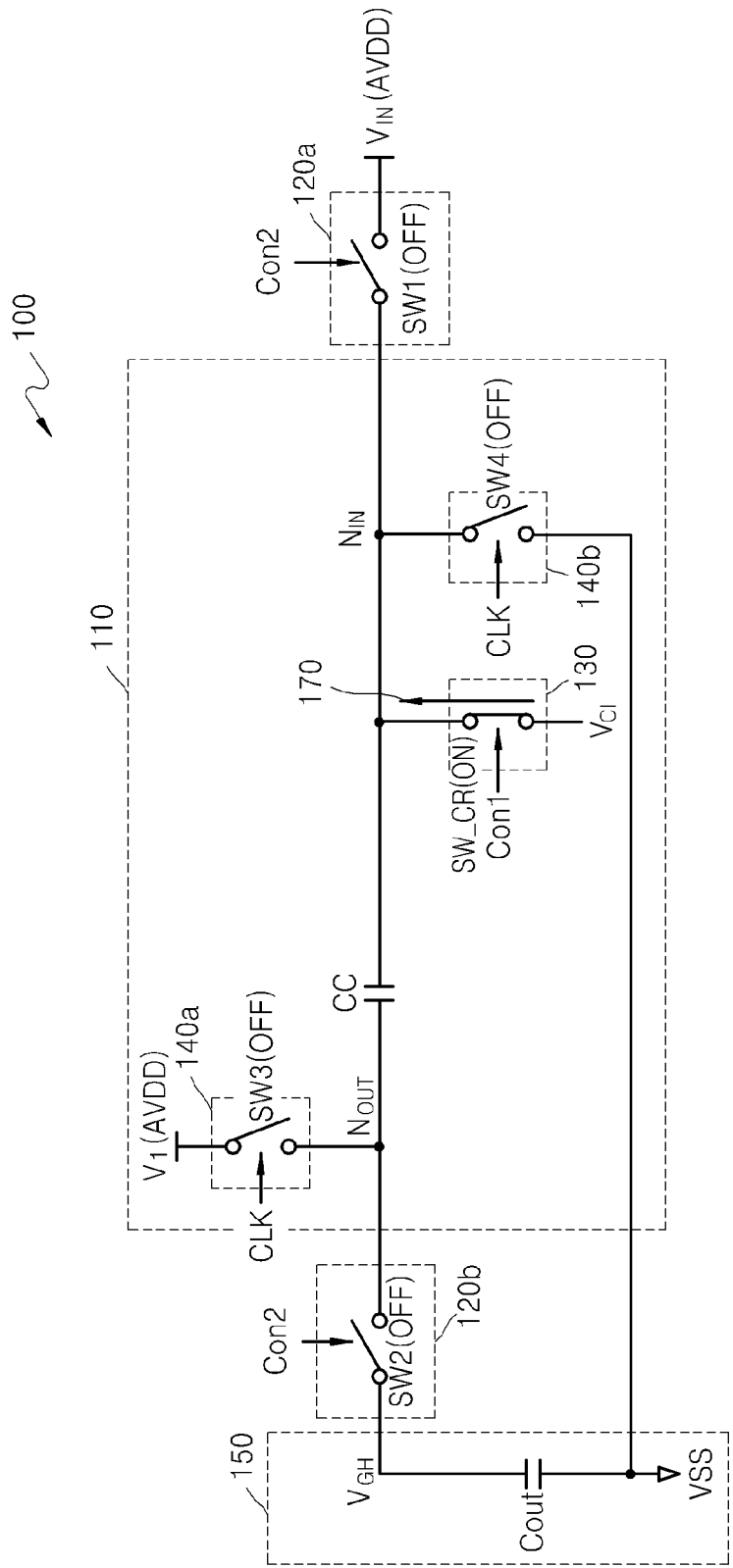
Figure 2C:
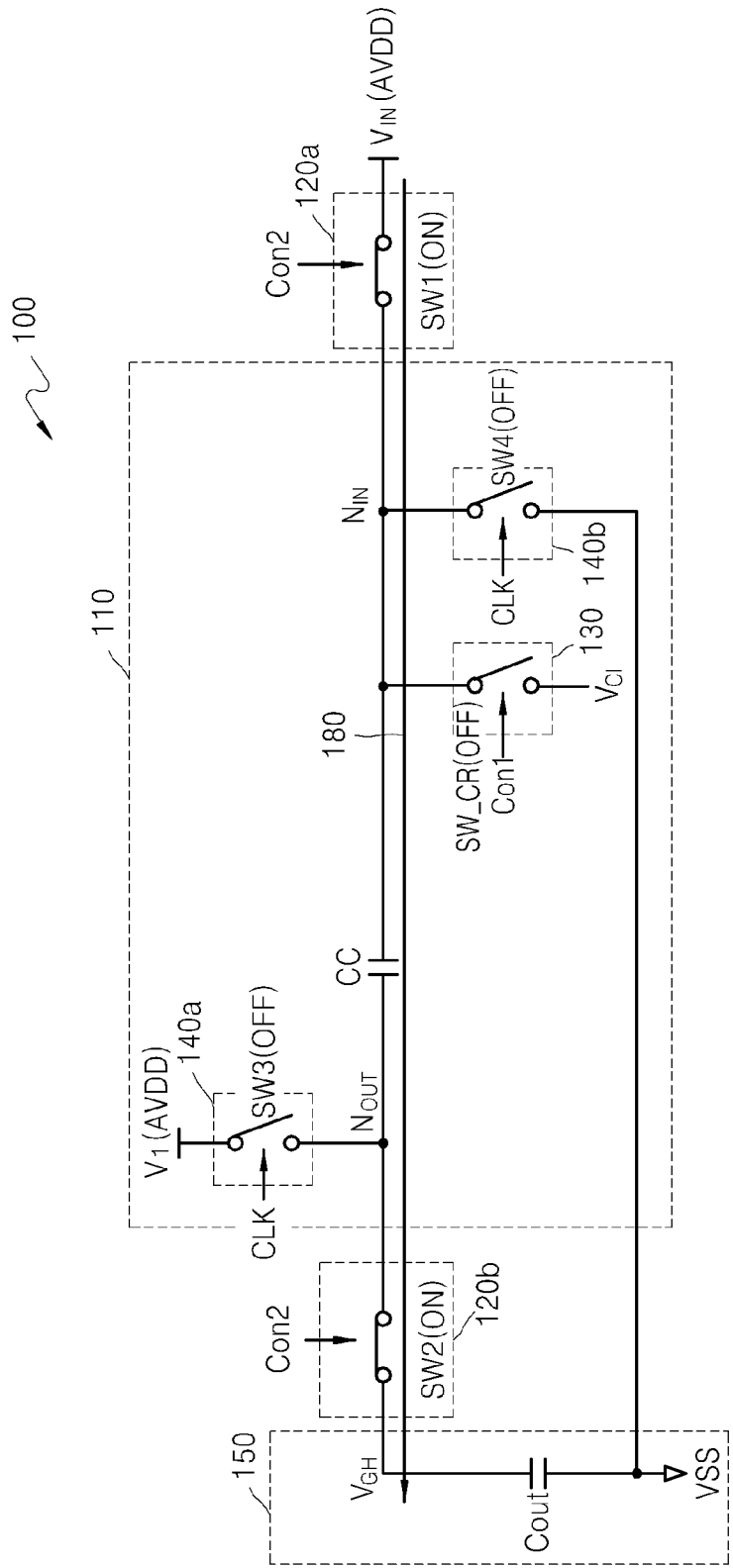

FIGS. 2A, 2B, and 2C are circuit diagrams illustrating operational states of the positive charge pump 100.

An operation of the positive charge pump 100 will now be described with reference to FIGS. 1A through 2C. An input voltage $V_{IN}$ and a first voltage $V_1$ may be a same voltage, and the voltage may be about equal to a power supply voltage AVDD. However, example embodiments of inventive concepts are not limited thereto. For example, the positive charge pump 100 may be a charge pump that boosts the power supply voltage AVDD to a double voltage 2AVDD. In other words, a target boosting voltage may be 2AVDD.

Referring to FIG. 1A, the positive charge pump 100 may include a charge pumping unit 110, first transfer units 120a, 120b and an output unit 150. The charge pumping unit 110 may perform a step-by-step boosting operation and a step-by-step initialization operation. To perform these operations, the charge pumping unit 110 may include a second transfer unit 130 and third transfer units 140a, 140b. The charge pumping unit 110 may include a pumping capacitor CC connected between an input node $N_{IN}$ and a boost node $N_{OUT}$.

The third transfer units 140a and 140b of the charge pump 110 may be configured to provide the first voltage $V_1$ such that the pumping capacitor CC is charged with the first voltage $V_1$ (e.g., during a second initialization operation). For example, to perform the second initialization operation, the third transfer unit 140a may include a third switch SW3 that transfers the first voltage $V_1$ to the boost node $N_{OUT}$ in response to a clock signal CLK. The third transfer unit 140b may include a fourth switch SW4 that grounds the input node $N_{IN}$ to a ground voltage VSS. The third switch SW3 and the fourth switch SW4 may be n-type metal oxide semiconductor (NMOS) transistors.

The first transfer units 120a, 120b may be configured to apply the input voltage $V_{IN}$ to the charge pumping unit 110 and thus provide the target boosting voltage (e.g., 2AVDD) to the output unit 150 (second boosting operation). For example, to perform the second boosting operation, the first transfer unit 120a may include a first switch SW1 for transferring the input voltage $V_{IN}$ to the input node $N_{IN}$ in response to a second control signal Con2. The first transfer unit 120b may include a second switch SW2 for transferring a voltage of the boost node $N_{OUT}$ to the output unit 150 in response to a second control signal Con2 (e.g., during an output operation).

The output unit 150 may be configured to output the target boosting voltage (e.g., 2AVDD) from the charge pumping unit 110 (e.g., during an output operation). That is, gate line high voltage $V_{GH}$ has 2 AVDD voltage level. For example, to perform the output operation, the output unit 150 may include an output capacitor $C_{out}$ to store $V_{GH}$.

For example, the positive charge pump 100 may perform different operations according to different logic states of the clock signal CLK, a first control signal Con1, and the second control signal Con2. This will be described in more detail below with reference to FIGS. 3A and 3B. $V_{NOUT}$ and $V_{NIN}$ indicate a voltage at the boost node $N_{OUT}$ and a voltage at the input node $N_{IN}$, respectively.

Referring to FIG. 1A and FIG. 1B, when the clock signal CLK is enabled, the third and fourth switches SW3 and SW4 may be closed. When the clock signal CLK is disabled, the third and fourth switches SW3 and SW4 may be opened. When the first control signal Con1 is enabled, a middle voltage application switch SW_CR may be closed. When the first control signal Con1 is disabled, the middle voltage application switch SW_CR may be opened. When the second control signal Con2 is enabled, the first and second switches SW1 and SW2 may be closed. When the second control signal Con2 is disabled, the first and second switches SW1 and SW2 may be opened.

The clock signal CLK and the second control signal Con2 may have different duty ratios such that level transition sections of the clock signal CLK are not overlapped by level transition sections of the second control signal Con2. In other words, enabled sections of the clock signal CLK may be different from enabled sections of the second control signal Con2. The first control signal Con1 may be enabled in first and second non-overlap sections Notm1 and Notm2 where both the clock signal CLK and the second control signal Con2 are disabled. In the first and second non-overlap sections Notm1 and Notm2, the first, second, third, and fourth switches SW1, SW2, SW3, and SW4 may be opened.

A method in which the positive charge pump 100 generates 2AVDD by boosting the input voltage $V_{IN}$ twice will now be described in more detail with reference to FIGS. 2A through 2C. As described above, the input voltage $V_{IN}$ and the first voltage $V_1$ may be a same voltage, and the voltage may be about equal to the power supply voltage AVDD.

Referring to FIG. 2A, a charge flow line 160 indicates a flow of charge in an initialization operation. For example, a flow of charge when the first voltage $V_1$ is stored in the pumping capacitor CC. For example, an operation of the positive charge pump 100 when the clock signal CLK is enabled and the first control signal Con1 and the second control signal Con2 are disabled is illustrated. Referring to the charge flow line 160, the third and fourth switches SW3 and SW4 may be closed in response to the clock signal CLK. Consequently, the first voltage $V_1$ may be stored in the pumping capacitor CC. Therefore, the voltage at the input node $N_{IN}$ may be the ground voltage VSS. The voltage at the boost node $N_{OUT}$ may be the power supply voltage AVDD.

Referring to FIG. 2B, a charge flow line 170 may indicate a flow of charge in a first boosting operation. For example, a flow of charge when a middle voltage $V_{CI}$ may be applied to the input node $N_{IN}$. For example, an operation of the positive charge pump 100 in the first non-overlap section Notm1 is illustrated. The middle voltage application switch SW_CR may be closed in response to the first control signal Con1. Consequently, the middle voltage $V_{CI}$ may be applied to the input node $N_{IN}$. The voltage at the input node $N_{IN}$ may be VSS+$V_{CI}$ and may be the result of positively boosting the ground voltage VSS by the middle voltage $V_{CI}$.

The voltage at the boost node $N_{OUT}$ may be AVDD+$V_{CI}$ by boosting the power supply voltage AVDD by the middle voltage $V_{CI}$. The middle voltage $V_{CI}$ may be any voltage between a minimum voltage (e.g., VSS) and a maximum voltage (e.g., AVDD) because the voltage at the input node $N_{IN}$ swings between VSS and AVDD. The middle voltage $V_{CI}$ may be ½·AVDD. For example, the voltage at the input node $N_{IN}$ may be ½·AVDD, and the voltage at the boost node $N_{OUT}$ may be 3/2·AVDD.

Referring to FIG. 2C, a charge flow line 180 indicates a flow of charge in the second boosting operation. For example, the charge flow line 180 may indicate a flow of charge when the input voltage $V_{IN}$ applied to the charge pumping unit 110 is boosted by the first voltage $V_1$ in the charge pumping unit 110. Consequently, the target boosting voltage (AVDD+AVDD=2AVDD) may be provided to the output unit 150. For example, an operation of the positive charge pump 100, when the clock signal CLK and the first control signal Con1 are disabled, and the second control signal Con2 may be enabled is illustrated. The first and second switches SW1 and SW2 may be closed in response to the second control signal Con2. Consequently, the power supply voltage AVDD, which may be the input voltage $V_{IN}$, may be transferred to the input node $N_{IN}$. Thus, the voltage at the input node $N_{IN}$ may be AVDD. The voltage at the boost node $N_{OUT}$ may be 2AVDD by positively boosting AVDD by the voltage of AVDD stored in the pumping capacitor CC. Consequently, 2AVDD may be transferred to the output unit 150.

The initialization operation described above with reference to FIG. 2A will now be described in more detail. The voltage of 2AVDD output from the charge pumping unit 110 may be initially stored in the output capacitor $C_{out}$. Correspondingly, discharge begins in the charge pumping unit 110.

When discharge begins, the positive charge pump 100 may undergo an operation of applying the middle voltage $V_{CI}$ in the second non-overlap section Notm2 such that the voltage of 2AVDD at the boost node $N_{OUT}$ may not drop to the first voltage $V_1$. For example, the positive charge pump 100 performs a first initialization operation when the first control signal Con1 is enabled and the clock signal CLK and the second control signal Con2 may be disabled. Then, the middle voltage application switch SW_CR may be closed in response to the first control signal Con1. Therefore, the middle voltage $V_{CI}$ may be transferred to the input node $N_{IN}$. For example, the voltage at the input node $N_{IN}$ may be ½·AVDD, and the voltage at the boost node $N_{OUT}$ may be 3/2·AVDD.

The positive charge pump 100 may perform the second initialization operation when the clock signal CLK is enabled and the first and second control signals Con1 and Con2 are disabled. The first voltage $V_1$ applied by the clock signal CLK may be retained in the pumping capacitor CC. Therefore, the voltage at the input node $N_{IN}$ may be the ground voltage VSS. The voltage at the boost node $N_{OUT}$ may be the power supply voltage AVDD.

In the conventional art, if the pumping capacitor CC is implemented in a semiconductor, the pumping capacitor CC is a capacitor using a gate oxide of a transistor or a metal insulator metal (MIM) capacitor. Therefore, parasitic capacitances will generated between the pumping capacitor CC and the input node $N_{IN}$ and between the pumping capacitor CC and the output node $N_{OUT}$. Accordingly, power consumption is increased due to unnecessary charging or discharging, and efficiency of a charge pump is degraded.

However, according to example embodiments, during a charge pump, the positive charge pump 100 may close the middle voltage application switch SW_CR in the first and second non-overlap sections Notm1 and Notm2 in order to prevent an inverse current. Therefore, perform a step-by-step pumping to reach the middle voltage $V_{CI}$ and increase above the middle voltage $V_{CI}$, for example, to pass through the middle voltage $V_{CI}$, during boosting. And perform step-by-step discharging to reach the middle voltage $V_{CI}$ and decrease below the middle voltage $V_{CI}$, for example, to pass through the middle voltage $V_{CI}$, during initialization, thereby reducing or minimizing charge loss caused by parasitic capacitances. Because the above-described operation may be performed during the first and second non-overlap sections Notm1 and Notm2, the time required for voltage stabilization may be reduced or minimized.

Figure 3A:
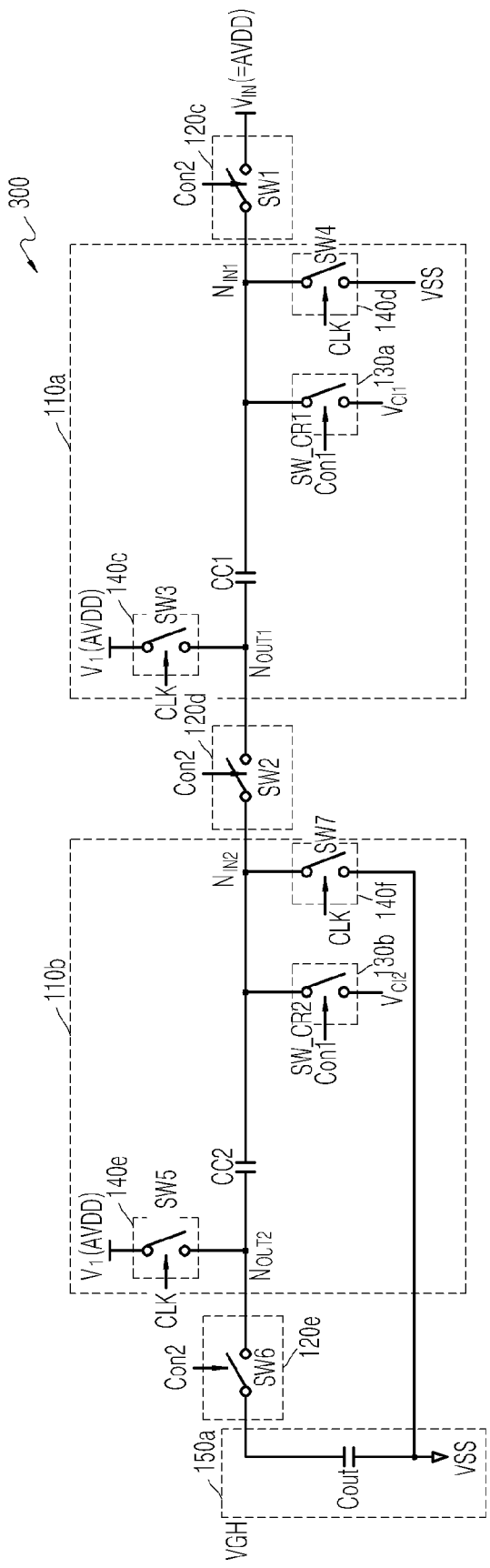
FIG. 3A is a circuit diagram illustrating a positive charge pump according to another embodiment of the inventive concept.

FIG. 3A is a circuit diagram illustrating a positive charge pump 300 according to example embodiments of inventive concepts. An input voltage $V_{IN}$ may be the same as the power supply voltage AVDD. For example, the positive charge pump 300 may be a circuit to output 3AVDD by boosting the power supply voltage AVDD three times. In other words, a target boosting voltage may be 3AVDD.

Referring to FIG. 3A, the charge pump 300 may include a first unit charge pumping unit 110a, a second unit charge pumping unit 110b, first transfer units 120c, 120d, 120e and an output unit 150a. The first unit charge pumping unit 110a may include a second transfer unit 130a, third transfer units 140c, 140d and a first pumping capacitor CC1 connected between a first input node $N_{IN1}$ and a first boost node $N_{OUT1}$. The second unit charge pumping unit 110b may include a second transfer unit 130b, third transfer units 140e and 140f, and a second pumping capacitor CC2 connected between a second input node $N_{IN2}$ and a second boost node $N_{OUT2}$.

The second transfer unit 130a, of the first unit charge pumping unit 110a, may be configured to provide a first middle voltage $V_{CI1}$ (e.g., during a first boosting operation and first initialization operation). For example, to perform the first boosting operation and the first initialization operation, the second transfer unit 130a may include a first middle voltage application switch SW_CR1 that transfers the first middle voltage $V_{CI1}$ to between the first input node $N_{IN1}$ and the first pumping capacitor CC1. The first middle voltage $V_{CI1}$ may be any voltage between a minimum voltage (e.g., VSS) and a maximum voltage (e.g., AVDD) as the voltage at the first input node $N_{IN1}$ swings between VSS and AVDD. The first middle voltage $V_{CI1}$ may be a voltage of ½·AVDD.

The third transfer units 140c, 140d, of the first unit charge pumping unit 110a, may be configured to provide the power supply voltage AVDD such that the power supply voltage AVDD may be stored in the first pumping capacitor CC1 (e.g., during a second initialization operation). For example, to perform the second initialization operation, the third transfer unit 140c may include a third switch SW3 that transfers the power supply voltage AVDD to the first boost node $N_{OUT1}$ in response to a clock signal CLK. The third transfer unit 140d may include a fourth switch SW4 that grounds the first input node $N_{IN1}$ to a ground voltage VSS.

The second transfer unit 130b, of the second unit charge pumping unit 110b, may be configured to provide a second middle voltage $V_{CI2}$ (e.g., during a first boosting operation and first initialization operation). For example, to perform the first boosting operation and the first initialization operation, the second transfer unit 130b may include a second middle voltage application switch SW_CR2 that transfers the second middle voltage $V_{CI2}$ to a node between the second input node $N_{IN2}$ and the second pumping capacitor CC2. The second middle voltage $V_{CI2}$ may be any voltage between a minimum voltage (e.g., VSS) and a maximum voltage (e.g., 2AVDD) as the voltage at the second input node $N_{IN2}$ swings between VSS and 2AVDD. The second middle voltage $V_{CI2}$ may be a voltage of AVDD.

The third transfer units 140e, 140f, of the second unit charge pumping unit 110b, may be configured to provide the power supply voltage AVDD such that the power supply voltage AVDD may be stored in the second pumping capacitor CC2 (e.g., during a second initialization operation). For example, to perform the second initialization operation, the third transfer unit may 140e include a fifth switch SW5 to transfer the power supply voltage AVDD to the second boost node $N_{OUT2}$ in response to the clock signal CLK. The third transfer unit 140f may include a seventh switch SW7 to ground the second input node $N_{IN2}$ to the ground voltage VSS.

The first transfer units 120c, 120d, 120e may be configured to apply the input voltage $V_{IN}$ to the first unit charge pumping unit 110a; to provide 2AVDD obtained by boosting the input voltage $V_{IN}$ twice from the first unit charge pumping unit 110a to the second unit charge pumping unit 110b; and to provide 3AVDD from the second unit charge pumping unit 110b to the output unit 150a (e.g., during a second boosting operation). For example, to perform the second boosting operation, the first transfer units 120c, 120d, 120e may include a switch SW1, a switch SW2 and a switch SW6. Switch SW1 may be configured to transfer the input voltage $V_{IN}$ to the first input node $N_{IN1}$ of the first unit charge pumping unit 110a in response to a second control signal Con2.

Switch SW2 may be configured to transfer a voltage of the first boost node $N_{OUT1}$ of the first unit charge pumping unit 110a to the second input node $N_{IN2}$ of the second unit charge pumping unit 110b in response to the second control signal Con2. Switch SW6 may be configured to transfer a voltage of the second boost node $N_{OUT2}$ of the second unit charge pumping unit 110b to an output unit 150a in response to the second control signal Con2.

The output unit 150a may be configured to output the target boosting voltage (e.g., AVDD+AVDD+AVDD=3AVDD) from the second unit charge pumping unit 110b (e.g., during an output operation). Although two charge pumping units having the same structure are serially connected to each other in the embodiment of FIG. 3A, example embodiments of inventive concepts are not limited thereto, and more than two charge pumping units may be serially connected. Although not shown in the drawings, a positive boosting voltage of 4AVDD may be obtained by cascade-connecting three charge pumps to one another.

Figure 3B:
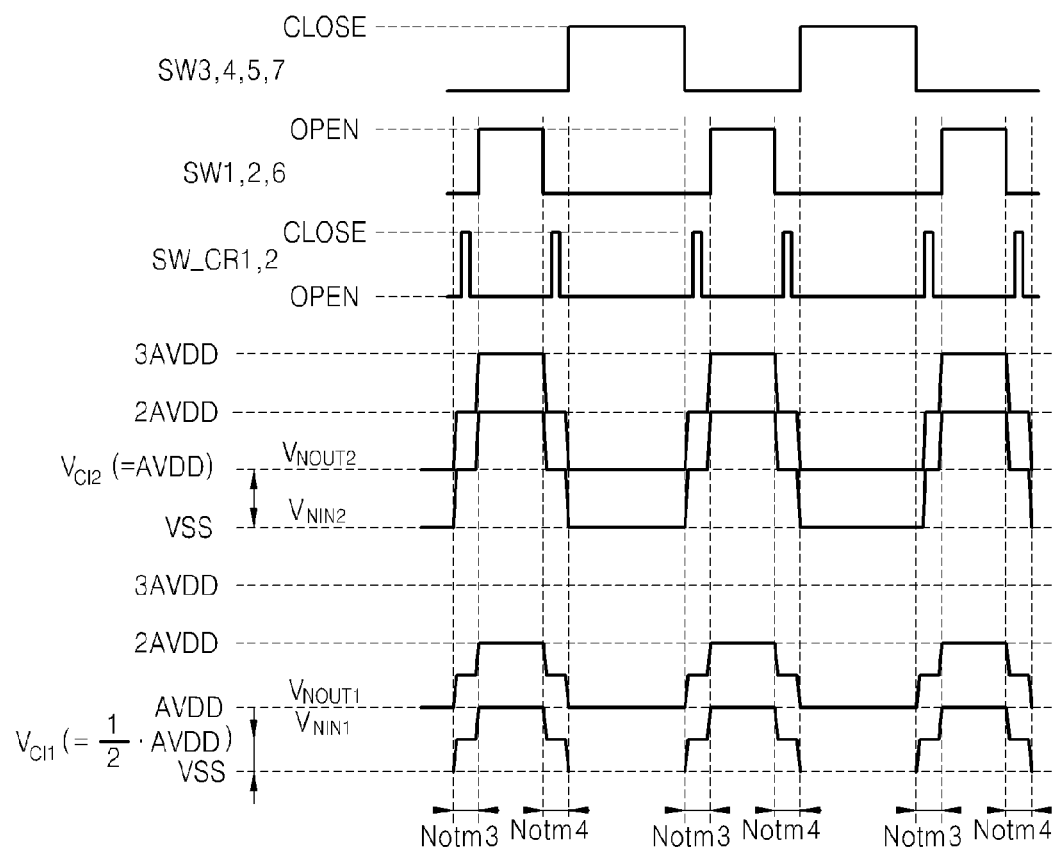
FIG. 3B is a timing diagram illustrating a detailed operation of the positive charge pump illustrated in FIG. 3A.

FIG. 3B is a timing diagram illustrating a detailed operation of the positive charge pump 300. As shown in FIG. 3B, $V_{NOUT1}$ and $V_{NIN1}$ may be voltages at both ends of the first pumping capacitor CC1. $V_{NOUT1}$ may indicate a voltage at the first boost node $N_{OUT1}$ and a voltage at the first input node $N_{IN1}$, respectively. $V_{NOUT2}$ and $V_{NIN2}$ may be voltages at both ends of the second pumping capacitor CC2. $V_{NIN1}$ may indicate a voltage at the second boost node $N_{OUT2}$ and a voltage at the second input node $N_{IN2}$.

Referring to FIGS. 3A and 3B, when the clock signal CLK is enabled, the third, fourth, fifth, and seventh switches SW3, SW4, SW5, and SW7 may be closed. When the clock signal CLK is disabled, the third, fourth, fifth, and seventh switches SW3, SW4, SW5, and SW7 may be opened. When the first control signal Con1 is enabled, the first and second middle voltage application switches SW_CR1 and SW_CR2 may be closed. When the first control signal Con1 is disabled, the first and second middle voltage application switches SW_CR1 and SW_CR2 may be opened. When the second control signal Con2 is enabled, the first, second, and sixth switches SW1, SW2, and SW6 may be closed (ON). When the second control signal Con2 is disabled, the first, second, and sixth switches SW1, SW2, and SW6 may be opened.

The clock signal CLK and the second control signal Con2 may have different duty ratios so that level transition sections of the clock signal CLK may not be overlapped by level transition sections of the second control signal Con2. The first control signal Con1 may be enabled in third and fourth non-overlap sections Notm3 and Notm4 where both the clock signal CLK and the second control signal Con2 are disabled. In the third and fourth non-overlap sections Notm3 and Notm4, the first, second, third, fourth, fifth, and sixth switches SW1, SW2, SW3, SW4, SW5, and SW6 may be opened.

The positive charge pump 300 may perform an initialization operation when the clock signal CLK is enabled and the first control signal Con1 and the second control signal Con2 are disabled. The third, fourth, fifth, and seventh switches SW3, SW4, SW5, and SW7 may be closed in response to the clock signal CLK. Consequently, the power supply voltage AVDD may be retained in each of the first pumping capacitor CC1 and the second pumping capacitor CC2. Accordingly, the voltage at the first input node $N_{IN1}$ may be the ground voltage VSS, and the voltage at the first boost node $N_{OUT1}$ may be AVDD. The voltage at the second input node $N_{IN2}$ may be the ground voltage VSS, and the voltage at the second output node $N_{OUT2}$ may be AVDD.

In the initialization operation, the positive charge pump 300 may perform the first boosting operation in the third non-overlap section Notm3. For example, the first and second middle voltage application switches SW_CR1 and SW_CR2 may be closed in response to the first control signal Con1. Consequently, the first middle voltage $V_{CI1}$ is transferred to the first input node $N_{IN1}$. The second middle voltage $V_{CI2}$ is transferred to the second input node $N_{IN2}$.

The voltage at the first input node $N_{IN1}$ may be ½·AVDD (=VSS+½·AVDD) by boosting the ground voltage VSS by the first middle voltage $V_{CI1}$. The voltage at the first boost node $N_{OUT1}$ may be 3/2·AVDD (=AVDD+½·AVDD) by positively boosting the power supply voltage AVDD by the first middle voltage $V_{CI1}$. The voltage at the second input node $N_{IN2}$ may be AVDD (=VSS+AVDD) by boosting the ground voltage VSS by the second middle voltage $V_{CI2}$. The voltage at the second boost node $N_{OUT2}$ may be 2·AVDD (=AVDD+AVDD) by boosting the power supply voltage AVDD by the second middle voltage $V_{CI2}$.

In the first boosting operation, the positive charge pump 300 may perform the second boosting operation when the clock signal CLK and the first control signal Con1 may be disabled and the second control signal Con2 may be enabled. For example, the first, second, and sixth switches SW1, SW2, and SW6 may be closed in response to the second control signal Con2. Consequently, the power supply voltage AVDD, which may be a potential value of the input voltage $V_{IN}$, may be transferred to the first input node $N_{IN1}$ of the first charge pumping unit 110a. Accordingly, the voltage of the first input node $N_{IN1}$ may be AVDD.

The voltage of the first boost node $N_{OUT1}$ may be 2AVDD (=AVDD+AVDD) by boosting the power supply voltage AVDD by a voltage of AVDD stored in the first pumping capacitor CC1. Then, the voltage of the first boost node $N_{OUT1}$ may be transferred to the second input node $N_{IN2}$.

Accordingly, the voltage of the second input node $N_{IN2}$ may be 2AVDD. The voltage at the first boost node $N_{OUT2}$ may be 3 AVDD (=2AVDD+AVDD) by boosting 2AVDD by a voltage of AVDD retained in the second pumping capacitor CC2.

The initialization operation may also performed to correspond to the boosting operation. During the initialization operation, the voltage of 3AVDD may be initially stored in the output capacitor $C_{out}$. In addition, discharging begins in the first unit charge pumping unit 110a and the second unit charge pumping unit 110b.

When discharging begins, the positive charge pump 300 may perform the first initialization operation in the fourth non-overlap section Notm4. For example, the first and second middle voltage application switches SW_CR1 and SW_CR2 may be closed in response to the first control signal Con1. Consequently, the first middle voltage $V_{CI1}$ may be transferred to between the first input node $N_{IN2}$ and the first pumping capacitor CC1. For example, the voltage at the first input node $N_{IN2}$ may be ½·AVDD, and the voltage at the first boost node $N_{OUT1}$ may be 3/2·AVDD. The second middle voltage $V_{CI2}$ may be transferred to the second input node $N_{IN2}$ and the second pumping capacitor CC2. For example, the voltage at the second input node $N_{IN2}$ may be AVDD, and the voltage at the second output node $N_{OUT2}$ may be 2·AVDD.

The positive charge pump 300 may perform the second initialization operation when the clock signal CLK is enabled and the first control signal Con1 and the second control signal Con2 may be disabled. For example, the third, fourth, fifth, and seventh switches SW3, SW4, SW5, and SW7 may be closed in response to the clock signal CLK. Consequently, the power supply voltage AVDD may be stored in each of the first pumping capacitor CC1 and the second pumping capacitor CC2. Accordingly, the voltage at the first input node $N_{IN1}$ may be the ground voltage VSS, and the voltage at the first boost node $N_{OUT1}$ may be the power supply voltage AVDD. The voltage at the second input node $N_{IN2}$ may be the ground voltage VSS, and the voltage at the second boost node $N_{OUT2}$ may be the power supply voltage AVDD.

In conventional art, if the first and second pumping capacitors CC1 and CC2 are implemented in a semiconductor, the first and second pumping capacitors CC1 and CC2 are capacitors using a gate oxide of a transistor or MIM capacitors. Therefore, parasitic capacitances will be generated between the first and second pumping capacitors CC1 and CC2 and the input node (e.g., $N_{IN1}$ and $N_{IN2}$) and the output node (e.g., $N_{OUT1}$ and $N_{OUT2}$). Accordingly, power consumption is increased due to unnecessary charging or discharging, and efficiency of a charge pump is degraded.

However, in example embodiments, when performing a charge pump, the positive charge pump 300 may close the first and second middle voltage application switches SW_CR1 and SW_CR2 in the third and fourth non-overlap sections Notm3 and Notm4 in order to prevent or minimize an inverse current. Therefore, perform a step-by-step pumping so as to pass through the first and second middle voltages $V_{CI1}$ and $V_{CI2}$ during boosting. And perform step-by-step discharging so as to pass through the first and second middle voltages $V_{CI1}$ and $V_{CI2}$ during initialization. Therefore, reducing or minimizing charge loss caused by parasitic capacitances. Because the above-described operation may be performed during the third and fourth non-overlap sections Notm3 and Notm4, the time required for voltage stabilization may be reduced or minimized.

Figure 4A:
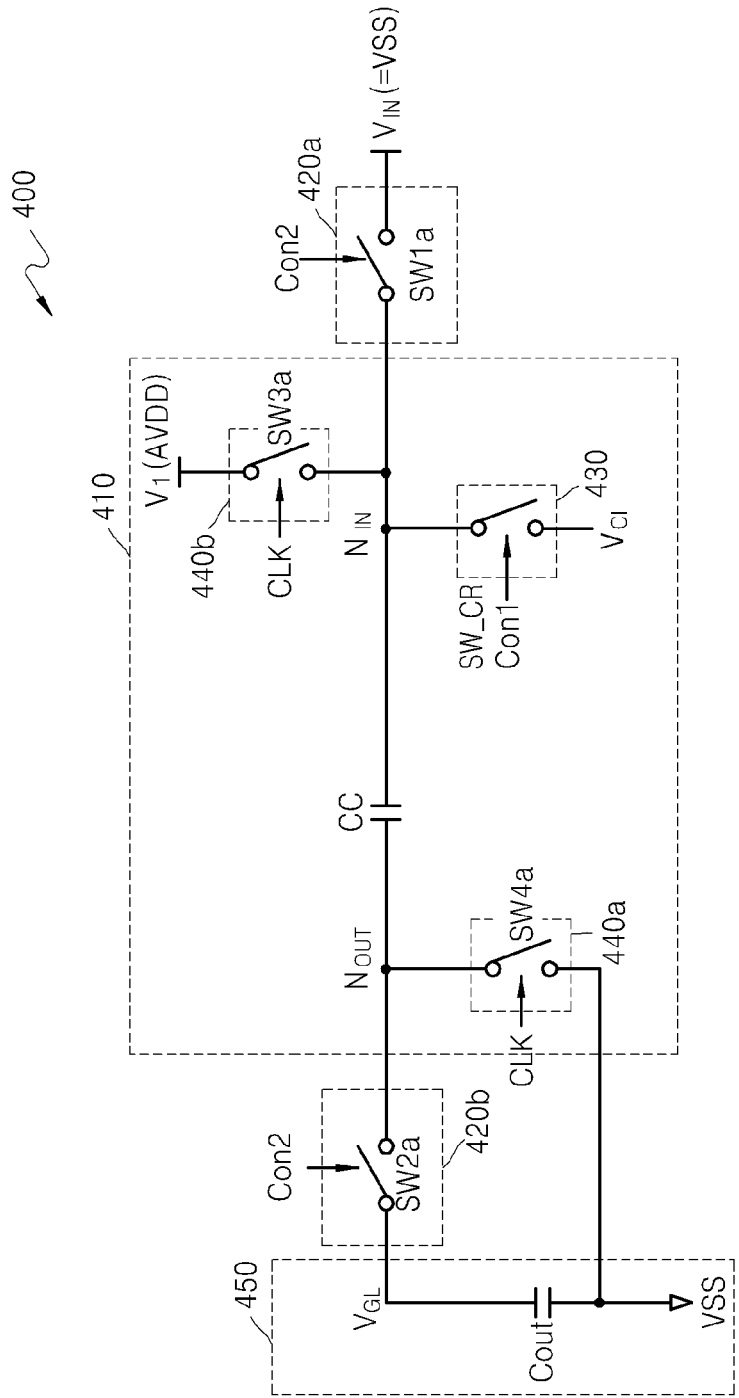
FIG. 4A is a circuit diagram illustrating a negative charge pump according to example embodiments of inventive concepts.
Figure 4B:
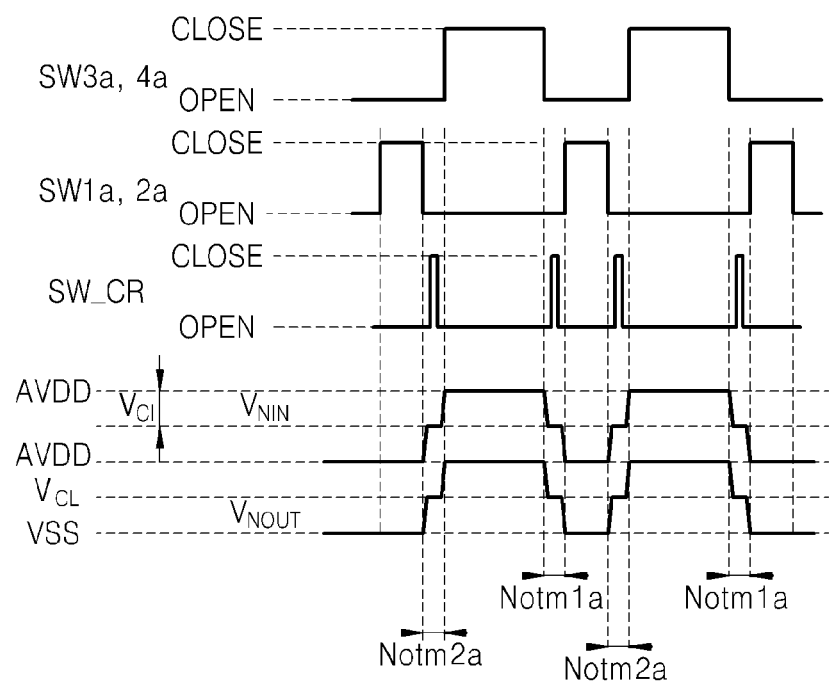
FIG. 4B is a timing diagram illustrating a detailed operation of the negative charge pump illustrated in FIG. 4A.

FIG. 4A is a circuit diagram illustrating a negative charge pump 400 according to example embodiments of inventive concepts. FIG. 4B is a timing diagram illustrating a detailed operation of the negative charge pump 400.

Figure 5A:
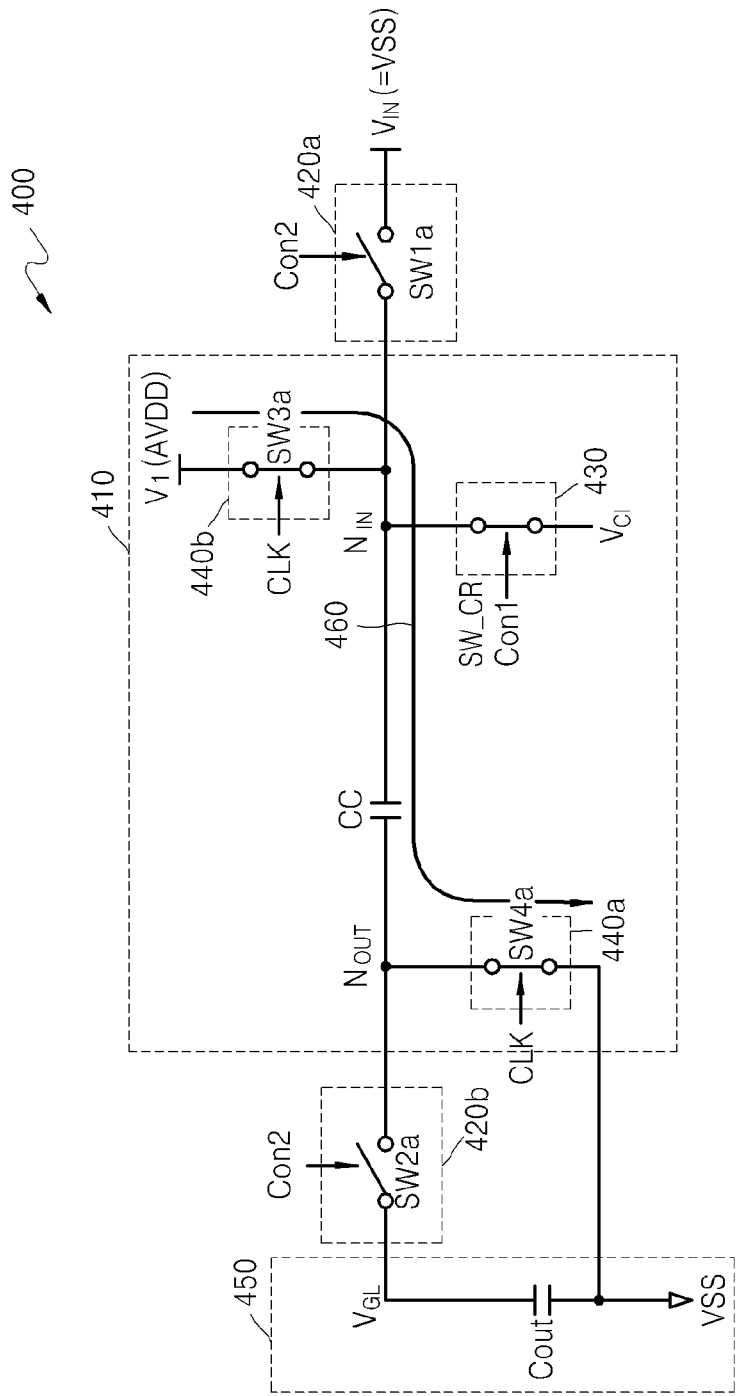
FIGS. 5A, 5B, and 5C are circuit diagrams illustrating operational states of the negative charge pump illustrated in FIG. 4A.
Figure 5B:
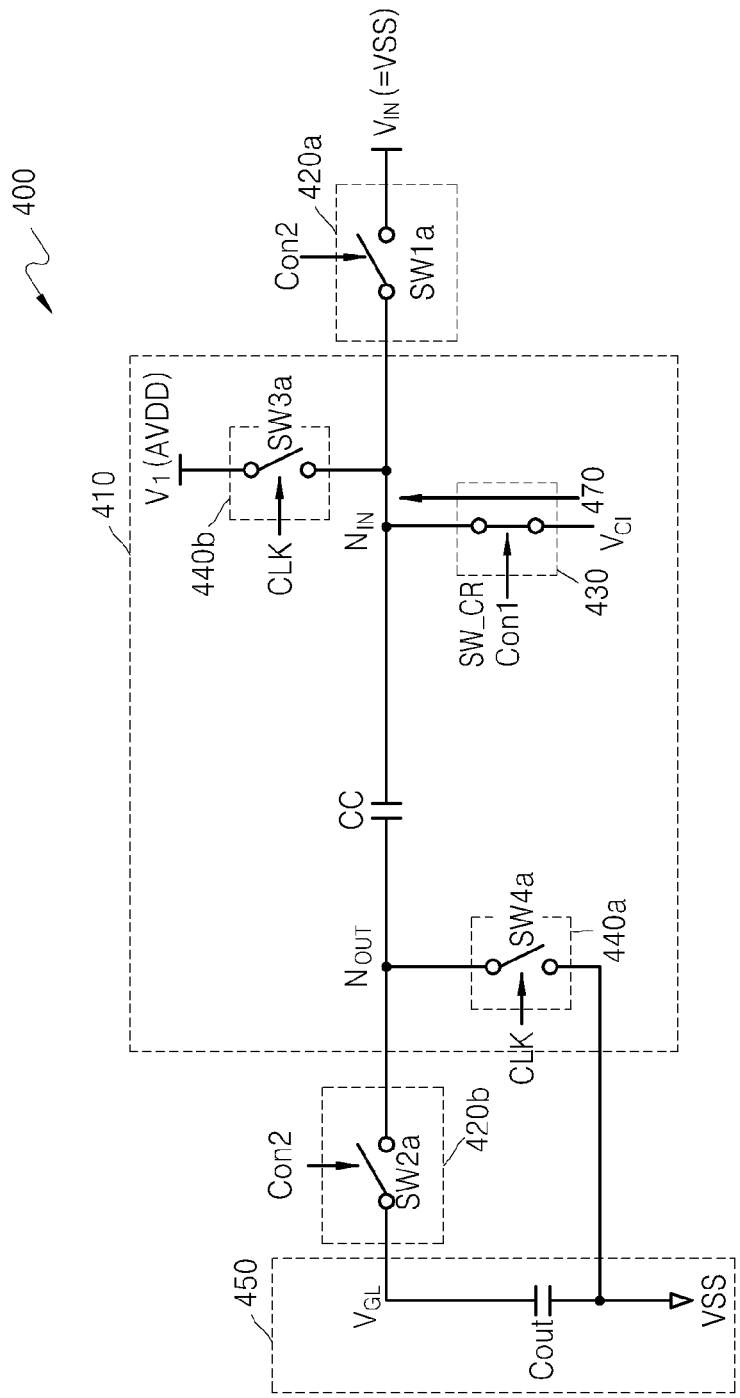
Figure 5C:
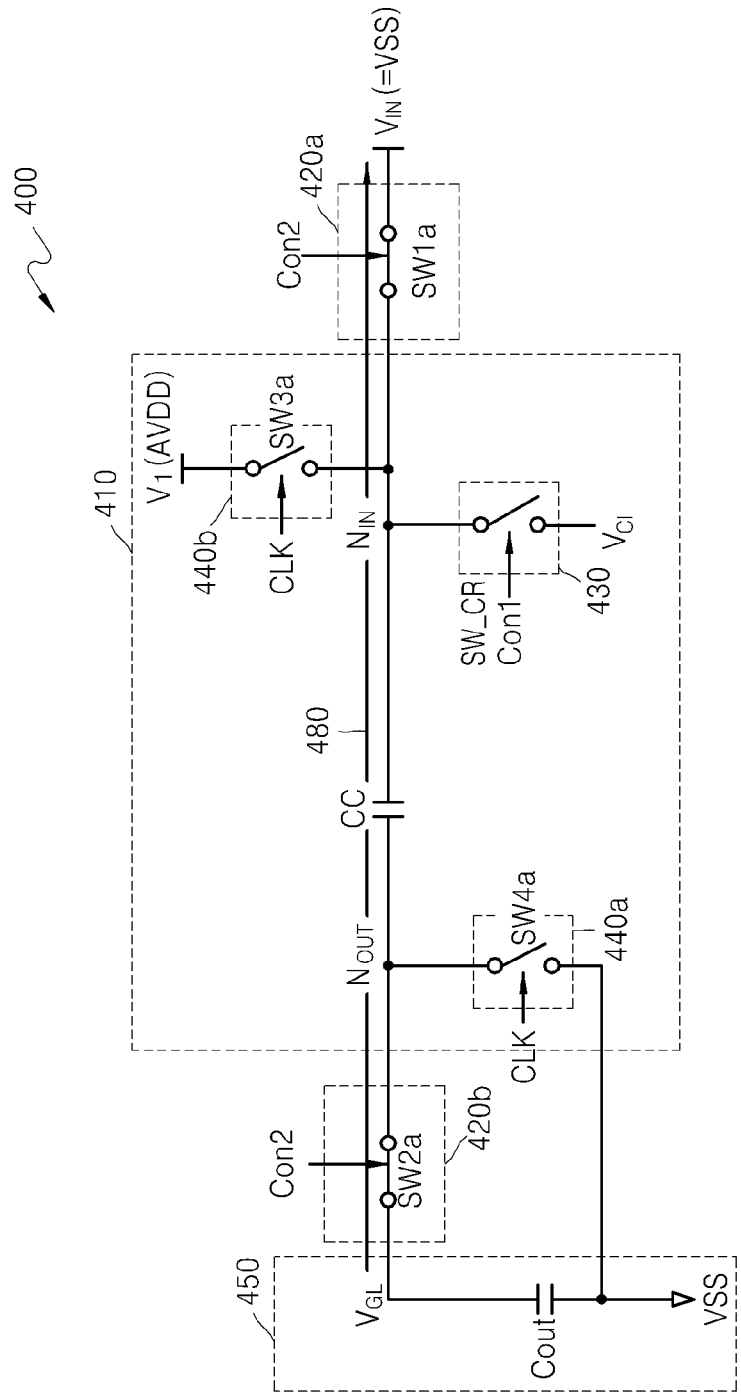

FIGS. 5A, 5B, and 5C are circuit diagrams illustrating operational states of the negative charge pump 400 illustrated in FIG. 4A.

An operation of the negative charge pump 400 will now be described with reference to FIGS. 4A through 5C. An input voltage $V_{IN}$ may be a ground voltage VSS, and a power supply voltage AVDD may be a power supply voltage AVDD. However, example embodiments of inventive concepts are not limited thereto. For example, the negative charge pump 400 may negatively boost a voltage of a boost node from the ground voltage VSS to −AVDD. In other words, a target boosting voltage may be −AVDD.

Referring to FIG. 4A, the negative charge pump 400 may include a charge pumping unit 410, first transfer units 420a and 420b, and an output unit 450. The charge pumping unit 410 may perform a step-by-step boosting operation and a step-by-step initialization operation. To perform these operations, the charge pumping unit 410 may include a second transfer unit 430 and third transfer units 440a and 440b. The charge pumping unit 410 may include a pumping capacitor CC connected between an input node $N_{IN}$ and a boost node $N_{OUT}$.

The second transfer unit 430, of the charge pump 410, may be configured to provide a middle voltage $V_{CI}$ (first boosting operation and first initialization operation). For example, to perform these operations, the second transfer unit 430 may include a middle voltage application switch SW_CR that transfers the middle voltage $V_{CI}$ to a node between the input node $N_{IN}$ and the pumping capacitor CC in response to a first control signal Con1. The middle voltage $V_{CI}$ may be any voltage between the ground voltage VSS and the power supply voltage AVDD as a voltage at the input node $N_{IN}$ swings between the ground voltage VSS and the power supply voltage AVDD. An absolute value of the middle voltage $V_{CI}$ may be a voltage of ½·AVDD.

The third transfer units 440a, 440b, of the charge pump 410, may be configured to provide the power supply voltage AVDD to charge the pumping capacitor CC with the power supply voltage AVDD (second initialization operation). For example, to perform the second initialization operation, the third transfer unit 440a may include a fourth switch SW4a that transfers the ground voltage VSS to the boost node $N_{OUT}$ in response to a clock signal CLK. The third transfer unit 440b may include a third switch SW3a that connects the input node $N_{IN}$ to the power supply voltage AVDD in response to the clock signal CLK. The third switch SW3a and the fourth switch SW4a may be NMOS transistors.

The first transfer unit 420a may be configured to apply the input voltage $V_{IN}$ to the charge pumping unit 410 and thus provide a target boosting voltage (i.e., −AVDD) to the output unit 450 (second boosting operation). For example, to perform the second boosting operation, the first transfer unit 420a may include a first switch SW1a for transferring the input voltage $V_{IN}$ to the input node $N_{IN}$ in response to a second control signal Con2. The first transfer unit 420b may include a second switch SW2a for transferring a voltage of the boost node $N_{OUT}$ to the output unit 450 (e.g., during an output operation) in response to a second control signal Con2.

The output unit 450 may be configured to output the target boosting voltage (e.g., −AVDD) from the charge pumping unit 410 (output operation). For example, gate line low voltage $V_{GL}$ may be a −AVDD voltage level. For example, to perform the output operation, the output unit 450 may include an output capacitor $C_{out}$ between an output terminal $V_{GL}$ and a ground terminal for the ground voltage VSS in which $V_{GL}$ may be stored.

For example, the negative charge pump 400 may perform different operations according to different logic states of the clock signal CLK, the first control signal Con1, and the second control signal Con2. This will be described in more detail below with reference to FIG. 4B. $V_{NOUT}$ and $V_{NIN}$ may be voltages at both ends of a capacitor, and may indicate a voltage at the boost node $N_{NOUT}$ and a voltage at the input node $N_{NIN}$, respectively.

Referring to FIGS. 4A and 4B, when the clock signal CLK is enabled, the third and fourth switches SW3a and SW4a may be closed. When the clock signal CLK is disabled, the third and fourth switches SW3a and SW4a may be opened. When the first control signal Con1 is enabled, a middle voltage application switch SW_CRa may be closed. When the first control signal Con1 is disabled, the middle voltage application switch SW_CRa may be opened. When the second control signal Con2 is enabled, the first and second switches SW1a and SW2a may be closed. When the second control signal Con2 is disabled, the first and second switches SW1a and SW2a may be opened.

The clock signal CLK and the second control signal Con2 may have different duty ratios so that level transition sections of the clock signal CLK may not be overlapped by level transition sections of the second control signal Con2. In other words, enabled sections of the clock signal CLK may be different from enabled sections of the second control signal Con2.

The first control signal Con1 may be enabled in first and second non-overlap sections Notm1a and Notm2a where both the clock signal CLK and the second control signal Con2 are disabled. In the first and second non-overlap sections Notm1a and Notm2a, the first, second, third, and fourth switches SW1a, SW2a, SW3a, and SW4a may be opened.

A process in which the negative charge pump 400 boosts the voltage of the boost node from the ground voltage VSS to −AVDD will now be described in more detail with reference to FIGS. 5A through 5C. As described above, the input voltage $V_{IN}$ may be the ground voltage VSS, and the power supply voltage AVDD may be the power supply voltage AVDD.

Referring to FIG. 5A, a charge flow line 460 may indicate a flow of charge in an initialization operation, for example, a flow of charge when the power supply voltage AVDD is retained in the pumping capacitor CC. For example, an operation of the negative charge pump 400 when the clock signal CLK is enabled and the first control signal Con1 and the second control signal Con2 are disabled is illustrated. The third and fourth switches SW3a and SW4a may be closed in response to the clock signal CLK. Consequently, the power supply voltage AVDD may be stored in the pumping capacitor CC. Thus, the voltage at the input node $N_{IN}$ may be the power supply voltage AVDD. The voltage at the boost node $N_{OUT}$ may be may be the ground voltage VSS.

Referring to FIG. 5B, a charge flow line 470 may indicate a flow of charge in a first boosting operation, for example, a flow of charge when a middle voltage $V_{CI}$ may be applied to the input node $N_{IN}$. For example, an operation of the negative charge pump 400 in the first non-overlap section Notm1a is illustrated. The middle voltage application switch SW_CR may be closed in response to the first control signal Con1. Consequently, the middle voltage $V_{CI}$ may be applied to the input node $N_{IN}$. The voltage at the input node $N_{IN}$ may be the middle voltage $V_{CI}$.

The voltage at the boost node $N_{OUT}$ may be $V_{CI}$−AVDD obtained by negatively boosting the middle voltage $V_{CI}$ by the power supply voltage AVDD. The middle voltage $V_{CI}$ may be any voltage between a minimum voltage (e.g., VSS) and a maximum voltage (e.g., AVDD) as the voltage at the input node $N_{IN}$ swings between VSS and AVDD. If the middle voltage $V_{CI}$ is ½·AVDD, the voltage at the input node $N_{IN}$ may be ½·AVDD, and the voltage at the boost node $N_{OUT}$ may be −½·AVDD.

Referring to FIG. 5C, a charge flow line 480 may indicate a flow of charge in the second boosting operation. For example, the charge flow line 480 may indicate a flow of charge when the input voltage $V_{IN}$ applied to the charge pumping unit 410 is negatively boosted by the power supply voltage AVDD in the charge pumping unit 410. Consequently, the target boosting voltage (0−AVDD=−AVDD) may be provided to the output unit 450. For example, an operation of the negative charge pump 400 when the clock signal CLK and the first control signal Con1 are disabled and the second control signal Con2 is enabled is illustrated.

The first and second switches SW1a and SW2a may be closed in response to the second control signal Con2. Consequently, the ground voltage VSS, which may be the input voltage $V_{IN}$, may be transferred to the input node $N_{IN}$. Thus, the voltage at the input node $N_{IN}$ may be the ground voltage VSS. The voltage at the boost node $N_{OUT}$ may be −AVDD obtained by negatively boosting the ground voltage VSS by the voltage of AVDD stored in the pumping capacitor CC. Consequently, −AVDD may be transferred to the output unit 450.

First and second initialization operations of the negative charge pump 400 may be performed to correspond to the first and second boosting operations. Because the principles of the first and second initialization operations of the negative charge pump 400 may be similar to those of the positive charge pump 100 described above, a detailed description thereof will be omitted.

By closing the middle voltage application switch SW_CR in the first and second non-overlap sections Notm1a and Notm2a, the negative charge pump 400 according to the example embodiments may perform step-by-step pumping so as to pass through the middle voltage $V_{CI}$ during boosting and may perform step-by-step discharging to pass through the middle voltage $V_{CI}$ during initialization, thereby reducing charge loss caused by parasitic capacitances. Because the above-described operation may be performed during the first and second non-overlap sections Notm1a and Notm2a, the time required for voltage stabilization may be reduced or minimized.

Figure 6A:
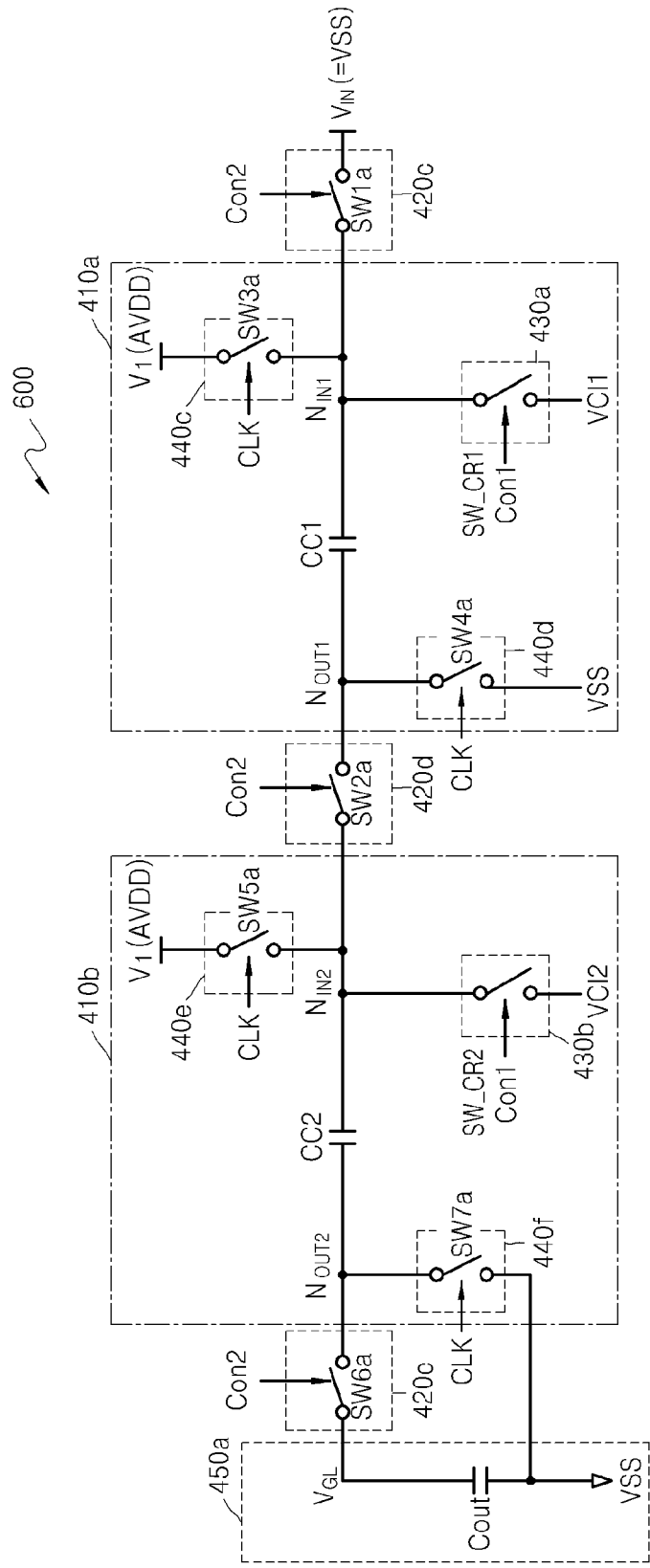
FIG. 6A is a circuit diagram illustrating a negative charge pump according to example embodiments of inventive concepts.

FIG. 6A is a circuit diagram of a negative charge pump 600 according to example embodiments of inventive concepts. An input voltage $V_{IN}$ may be a ground voltage VSS and a power supply voltage AVDD of FIG. 6A may be power supply voltages AVDD. For example, the negative charge pump 600 may be a circuit that negatively boosts the power supply voltage AVDD by −2AVDD. In other words, a target boosting voltage may be −2AVDD.

Referring to FIG. 6A, the negative charge pump 600 may include a first unit charge pumping unit 410a, a second unit charge pumping unit 410b, first transfer units 420c, 420d, 420e and an output unit 450a.

The first unit charge pumping unit 410a and the second unit charge pumping unit 410b may have the same structure and functions as those of the charge pumping unit 410 of FIGS. 4A and 4B described above. To perform an operation, the first unit charge pumping unit 410a may include a second transfer unit 430a, third transfer units 440c, 440d and a first pumping capacitor CC1 connected between a first input node $N_{IN1}$ and a first boost node $N_{OUT1}$. The second unit charge pumping unit 410b may include a second transfer unit 430b, third transfer units 440e, 440f and a second pumping capacitor CC2 connected between a second input node $N_{IN2}$ and a second boost node $N_{OUT2}$.

The second transfer unit 430a, of the first unit charge pumping unit 410a, may be configured to provide a first middle voltage $V_{CI1}$ (first boosting operation and first initialization operation). For example, to perform the first boosting operation and the first initialization operation, the second transfer unit 430a may include a first middle voltage application switch SW_CR1 that transfers the first middle voltage $V_{CI1}$ between the first input node $N_{IN1}$ and the first pumping capacitor CC1 in response to a first control signal Con1. The first middle voltage $V_{CI1}$ may be any voltage between a minimum voltage (e.g., VSS) and a maximum voltage (e.g., AVDD) as the voltage at the first input node $N_{IN1}$ swings between VSS and AVDD. The first middle voltage $V_{CI1}$ may be a voltage of ½·AVDD.

The third transfer units 440c, 440d, of the first unit charge pumping unit 410a, may be configured to provide the power supply voltage AVDD to the first input node $N_{IN1}$ such that the power supply voltage AVDD may be stored in the first pumping capacitor CC1 and that a voltage at the first boost node $N_{OUT1}$ is connected to the ground voltage VSS (second initialization operation). For example, to perform the second initialization operation, the third transfer unit 440d may include a fourth switch SW4a that transfers the ground voltage VSS to the first boost node $N_{OUT1}$ in response to a clock signal CLK. The third transfer unit 440c may include a third switch SW3a that connects the first input node $N_{IN1}$ to a voltage supply for the power supply voltage AVDD in response to a clock signal CLK.

The second transfer unit 430b, of the second unit charge pumping unit 410b, may be configured to provide a second middle voltage $V_{CI1}$ (first boosting operation and first initialization operation). For example, to perform the first boosting operation and the first initialization operation, the second transfer unit 430b may include a second middle voltage application switch SW_CR2 that transfers the second middle voltage $V_{CI2}$ to a node between the second input node $N_{IN2}$ and the second pumping capacitor CC2 in response to a second control signal Con2. The second middle voltage $V_{CI2}$ may be any voltage between AVDD and −AVDD as the voltage at the second input node $N_{IN2}$ swings between AVDD and −AVDD. The second middle voltage $V_{CI2}$ may be the ground voltage VSS.

The third transfer units 440e, 440f, of the second unit charge pumping unit 410b, may be configured to provide the power supply voltage AVDD such that the power supply voltage AVDD may be stored in the second pumping capacitor CC2 and a voltage at the second boost node $N_{OUT2}$ is connected to the ground voltage VSS (second initialization operation). For example, to perform the second initialization operation, the third transfer unit 440f may include a seventh switch SW7a that transfers the ground voltage VSS to the second boost node $N_{OUT2}$ in response to the clock signal CLK. The third transfer unit 440e may include a fifth switch SW5a that connects the second input node $N_{IN2}$ to the voltage supply for the power supply voltage AVDD.

The first transfer units 420c, 420d, 420e may be configured to apply the input voltage $V_{IN}$ to the first unit charge pumping unit 410a; to provide −AVDD from negatively boosting the input voltage $V_{IN}$ from the first unit charge pumping unit 410a to the second unit charge pumping unit 410b; and to provide −2AVDD from the second unit charge pumping unit 410b to the output unit 450a (second boosting operation). For example, to perform the second boosting operation, the first transfer units 420c, 420d, 420e may include a switch SW1a, a switch SW2a and a switch SW6a.

Switch SW1a may be configured to transfer the input voltage $V_{IN}$ to the first input node $N_{IN1}$ of the first unit charge pumping unit 410a in response to a second control signal Con2. Switch SW2a may be configured to transfer a voltage of the first boost node $N_{OUT1}$ of the first unit charge pumping unit 410a to the second input node $N_{IN2}$ of the second unit charge pumping unit 410b in response to the second control signal Con2. Switch SW6a may be configured to transfer a voltage of the second boost node $N_{OUT2}$ of the second unit charge pumping unit 410b to an output unit 450a in response to the second control signal Con2.

The output unit 450a may be configured to output the target boosting voltage (e.g., VSS −AVDD−AVDD=−2AVDD) from the second unit charge pumping unit 410b (output operation). Although two charge pumping units having the same structure are serially connected to each other in the embodiment of FIG. 6A, the example embodiments of inventive concepts are not limited thereto, and more than two charge pumping units may be serially connected. Although not shown in the drawings, a negative boosting voltage of −3AVDD may be obtained by cascade-connecting three negative charge pumps to one another.

Figure 6B:
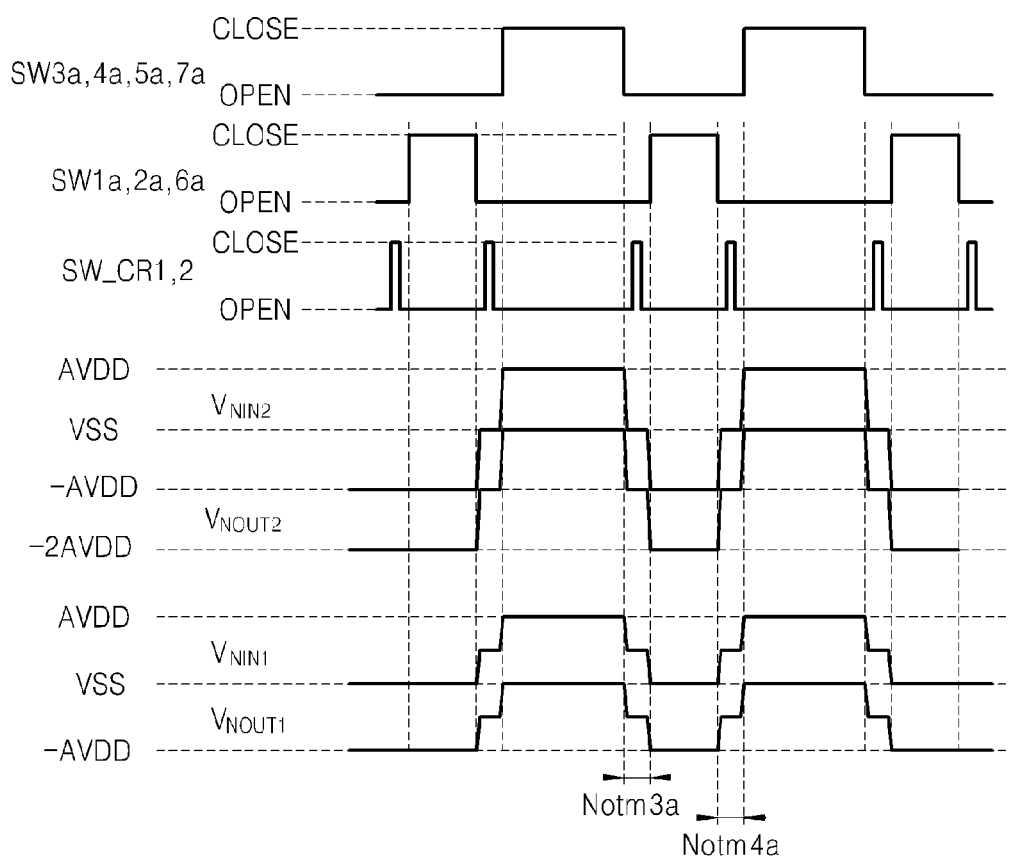
FIG. 6B is a timing diagram illustrating a detailed operation of the negative charge pump illustrated in FIG. 6A.

FIG. 6B is a timing diagram illustrating an operation of the negative charge pump 600. In FIG. 6B, $V_{NOUT1}$ and $V_{NIN1}$ may be voltages at both ends of the first pumping capacitor CC1, and may indicate a voltage at the first boost node $N_{OUT1}$ and a voltage at the first input node $N_{IN1}$, respectively. $V_{NOUT2}$ and $V_{NIN2}$ may be both-end voltages of the second pumping capacitor CC2, and may indicate a voltage at the second boost node $N_{OUT2}$ and a voltage at the second input node $N_{IN2}$, respectively.

The negative charge pump 600 may also perform different operations according to different logic states of the clock signal CLK, the first control signal Con1, and the second control signal Con2. This will be described in more detail with reference to FIGS. 6A and 6B.

Referring to FIGS. 6A and 6B, when the clock signal CLK is enabled, the third, fourth, fifth, and seventh switches SW3a, SW4a, SW5a, and SW7a may be closed. When the clock signal CLK is disabled, the third, fourth, fifth, and seventh switches SW3a, SW4a, SW5a, and SW7a may be opened. When the first control signal Con1 is enabled, the first and second middle voltage application switches SW_CR1 and SW_CR2 may be closed. When the first control signal Con1 is disabled, the first and second middle voltage application switches SW_CR1 and SW_CR2 may be opened.

When the second control signal Con2 is enabled, the first, second, and sixth switches SW1a, SW2a, and SW6a may be closed. When the second control signal Con2 is disabled, the first, second, and sixth switches SW1a, SW2a, and SW6a may be opened. The clock signal CLK and the second control signal Con2 may have different duty ratios so that level transition sections of the clock signal CLK may not be overlapped by level transition sections of the second control signal Con2.

The first control signal Con1 may be enabled in third and fourth non-overlap sections Notm3a and Notm4a where both the clock signal CLK and the second control signal Con2 are disabled. In the third and fourth non-overlap sections Notm3a and Notm4a, all of the first, second, third, fourth, fifth, and sixth switches SW1a, SW2a, SW3a, SW4a, SW5a, and SW6a are opened.

A method of generating −2AVDD by boosting the ground voltage VSS of a boost node will now be described with reference to FIGS. 6A and 6B.

The negative charge pump 600 may perform an initialization operation when the clock signal CLK is enabled and the first control signal Con1 and the second control signal Con2 may be disabled. The third, fourth, fifth, and seventh switches SW3a, SW4a, SW5a, and SW7a may be closed in response to the clock signal CLK. Consequently, the power supply voltage AVDD may be retained in each of the first pumping capacitor CC1 and the second pumping capacitor CC2. Accordingly, the voltage at the first input node $N_{IN1}$ may be the power supply voltage AVDD, and the voltage at the first boost node $N_{OUT1}$ may be the ground voltage VSS. The voltage at the second input node $N_{IN2}$ may be the power supply voltage AVDD, and the voltage at the second output node $N_{OUT2}$ may be the ground voltage VSS.

The negative charge pump 600 may perform the first boosting operation in the third non-overlap section Notm3a. For example, the first and second middle voltage application switches SW_CR1 and SW_CR2 may be closed in response to the first control signal Con1. Consequently, the first middle voltage $V_{CI1}$ may be transferred to the first input node $N_{IN1}$. The second middle voltage $V_{CI2}$ is transferred to the second input node $N_{IN2}$. Then, the voltage at the first input node $N_{IN1}$ may be ½·AVDD, which may be a potential of the first middle voltage $V_{CI1}$.

The voltage at the first boost node $N_{OUT1}$ may be −½·AVDD (=½·AVDD−AVDD) by negatively boosting the first middle voltage $V_{CI1}$ by the power supply voltage AVDD. The voltage at the second input node $N_{IN2}$ may be the ground voltage VSS, which may be a potential of the second middle voltage $V_{CI2}$. The voltage at the second boost node $N_{OUT2}$ may be −AVDD (=VSS−AVDD) obtained by negatively boosting the second middle voltage $V_{CI2}$ by the power supply voltage AVDD.

The negative charge pump 600 may perform the second boosting operation when the clock signal CLK and the first control signal Con1 are disabled and the second control signal Con2 is enabled. For example, the first, second, and sixth switches SW1a, SW2a, and SW6a may be closed in response to the second control signal Con2. Consequently, the ground voltage VSS, which may be a potential value of the input voltage $V_{IN}$, may be transferred to the first input node $N_{IN1}$ of the first unit charge pumping unit 410a.

Accordingly, the voltage of the first input node $N_{IN1}$ may be the ground voltage VSS. The voltage of the first boost node $N_{OUT1}$ may be −AVDD (=VSS−AVDD) obtained by negatively boosting the ground voltage VSS by the power supply voltage AVDD stored in the first pumping capacitor CC1. The voltage of the first boost node $N_{OUT1}$ may be transferred to the second input node $N_{IN2}$. Accordingly, the voltage of the second input node $N_{IN2}$ may be −AVDD. The voltage at the second boost node $N_{OUT2}$ may be −2AVDD (=−AVDD−AVDD) obtained by negatively boosting −AVDD by a voltage of AVDD retained in the second pumping capacitor CC2.

First and second initialization operations of the negative charge pump 600 may be performed to correspond to the first and second boosting operations. Because the principles of the first and second initialization operations of the negative charge pump 600 may be similar to those of the positive charge pump 100, a detailed description thereof will be omitted.

Figure 7:
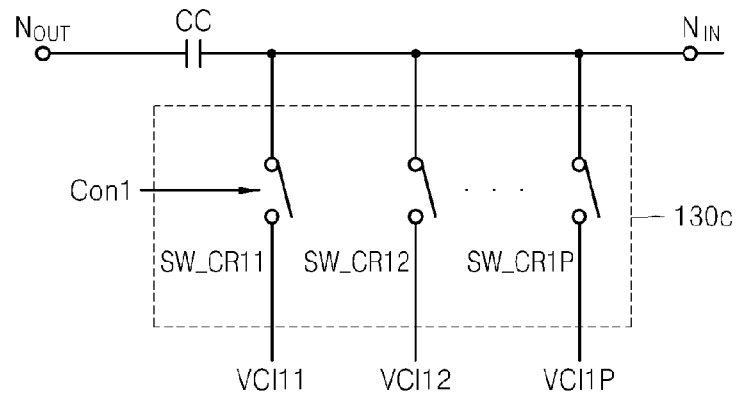

FIG. 7 is a circuit diagram illustrating a second transfer unit 130c according to example embodiments of inventive concepts.

Referring to FIG. 7, the second transfer unit 130c may include a total of P middle voltage application switches SW_CR11, SW_CR12, through to SW_CR1P which apply a plurality of middle voltages (e.g., P middle voltages VCI11, VCI12 to VCI1P).

When a charge pump according to example embodiments of inventive concepts use the second transfer unit 130c including the P middle voltage switches according to FIG. 7, the charge pump may perform a (P+1)-step boosting operation and a (P+1)-step initialization operation. According to this structure, a voltage may pass through the levels of many middle voltages (e.g., P middle voltages VCI11, VCI12, through to VCI1P), until reaching a target boosting voltage. Consequently, charge loss caused by parasitic capacitances may be reduced or minimized.

For example, supposing that a charge of Q is transferred to a power source to charge the pumping capacitor CC with a voltage of VDD, energy given by E=Q·VDD may be transferred in a first charging stage. On the other hand, in a second charging stage, energy given by $$E = \frac{1}{2}Q \cdot \frac{1}{2}VDD = \frac{3}{4}Q \cdot VDD$$

may be transferred. Thus, energy in the second charging stage may be reduced by up to 75% of the energy in the first charging stage. In addition, because the voltage passes through a voltage level of 2/VDD during discharge, energy may be recycled, and thus an overall energy may be reduced to 50% of the energy in the first charging stage.

Figure 8:
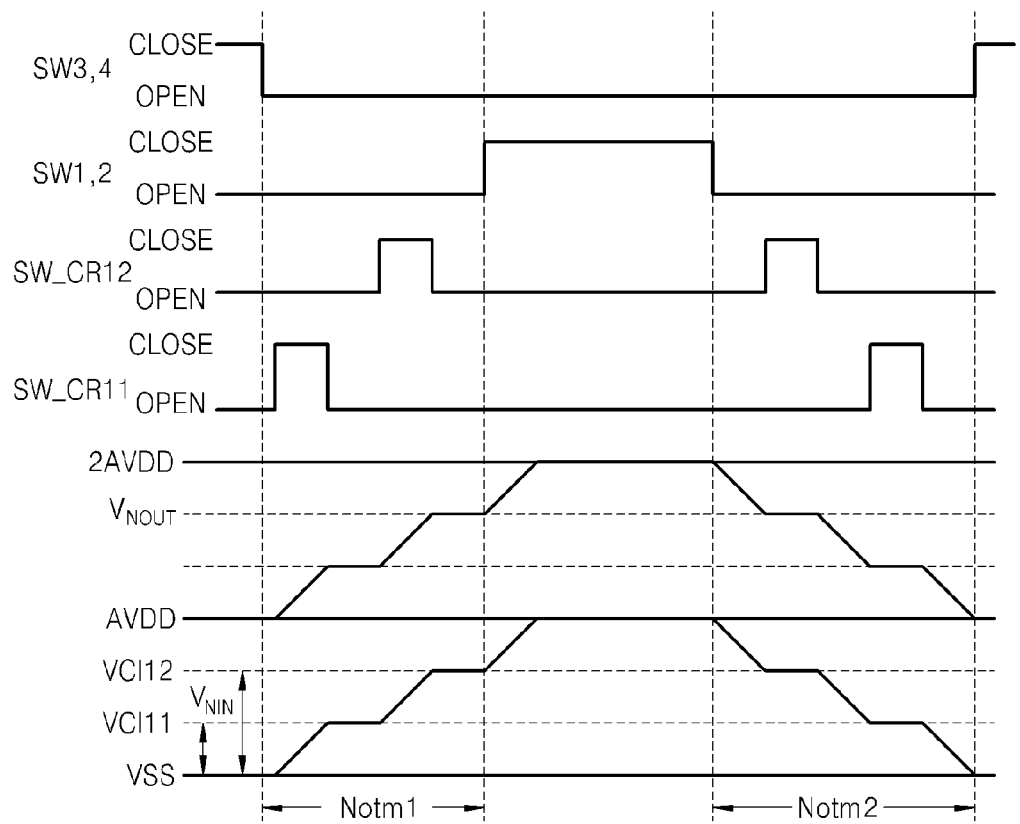

FIG. 8 is a timing diagram illustrating a detailed operation of the positive charge pump 100 of FIG. 1A when the positive charge pump 100 of FIG. 1A uses the second transfer unit 130c illustrated in FIG. 7. The number, P, of middle voltage application switches may be 2.

In the first non-overlap section Notm1, when the clock signal CLK and the second control signal Con2 are disabled, the first control signal Con1 may be enabled. Therefore, the first middle voltage application switch SW_CR11 may be closed. For example, the first middle voltage VCI11 may be applied between the pumping capacitor CC and the input node $N_{IN}$. A voltage at the input node $N_{IN}$ may be VCI11, and a voltage at the boost node $N_{OUT}$ may be AVDD+VCI11.

In, for example, the first non-overlap section Notm1, when the clock signal CLK and the second control signal Con2 are disabled, the first control signal Con1 may be enabled, and thus the second middle voltage application switch SW_CR12 may be closed. For example, the second middle voltage VCI12 is applied between the pumping capacitor CC and the input node $N_{IN}$. The voltage at the input node $N_{IN}$ may be VCI12, and the voltage at the boost node $N_{OUT}$ may be AVDD+VCI12.

In a section between the first non-overlap section Notm1 and the second non-overlap section Notm2, the second control signal Con2 is enabled and the first control signal Con1 and the clock signal CLK may be disabled. For example, the input voltage $V_{IN}$ may be boosted by the first voltage $V_1$ across the pumping capacitor CC. The voltage at the input node $N_{IN}$ may be AVDD, and the voltage at the boost node $N_{OUT}$ may be 2AVDD.

In the second non-overlap section Notm2, when the clock signal CLK and the second control signal Con2 are disabled, the first control signal Con1 is enabled and thus the second middle voltage application switch SW_CR12 may be closed. For example, the second middle voltage VCI12 may be applied between the pumping capacitor CC and the input node $N_{IN}$. The voltage at the input node $N_{IN}$ may be VCI12, and the voltage at the boost node $N_{OUT}$ may be AVDD+VCI12.

In the second non-overlap section Notm2, when the clock signal CLK and the second control signal Con2 are disabled, the first control signal Con1 may be enabled and thus the first the middle voltage application switch SW_CR11 may be closed. For example, the first middle voltage VCI11 is applied between the pumping capacitor CC and the input node $N_{IN}$. The voltage at the input node $N_{IN}$ may be VCI11, and the voltage at the boost node $N_{OUT}$ may be AVDD+VCI11.

After, for example, the second non-overlap section Notm2, the first control signal Con1 is enabled and the second control signal Con2 and the clock signal CLK may be disabled. For example, the first voltage $V_1$ may be applied to the boost node $N_{OUT}$, and thus the pumping capacitor CC may be charged with AVDD and the input node $N_{IN}$ may be grounded. The voltage at the input node $N_{IN}$ may be VSS, and the voltage at the boost node $N_{OUT}$ may be AVDD.

The embodiment of FIG. 8 is not limited to the positive charge pump 100 of FIG. 1A, and any other circuit such as a negative charge pump may be used. As long as the components of another circuit perform the same functions as those of the positive charge pump 100 of FIG. 1A, the use of the other circuit does not depart from the spirit and scope of example embodiments of inventive concepts.

Figure 9:
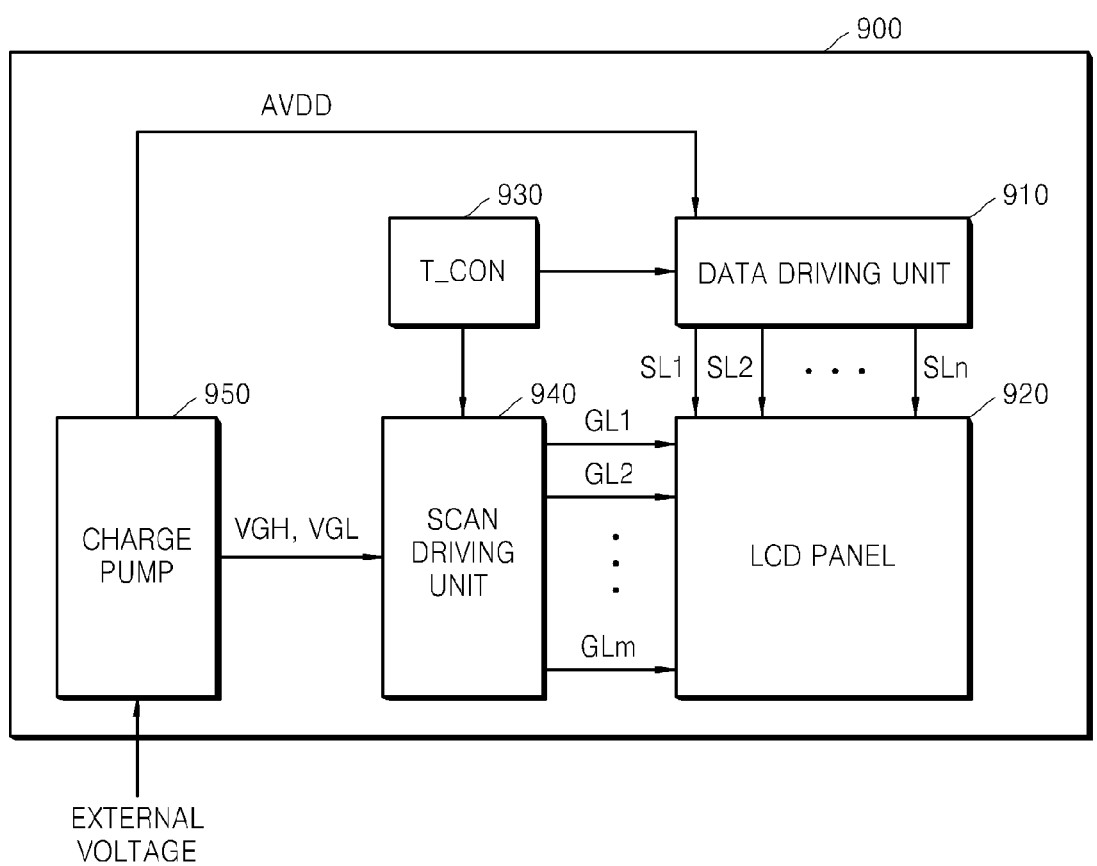

FIG. 9 is a block diagram illustrating a display driving system 900 according to example embodiments of inventive concepts. Referring to FIG. 9, the display driving system 900 may include a timing controller 930, a scan driving unit 940, a data driving unit 910, a liquid crystal display (LCD) panel 920, and a charge pump 950. The timing controller 930 may generate a control signal for controlling the scan driving unit 940 and the data driving unit 910, and may transmit an image signal received from an external source to the data driving unit 910.

For example, the scan driving unit 940 and the data driving unit 910 drive the LCD panel 920 according to the control signal received from the timing controller 930. The scan driving unit 940 sequentially applies scan signals to rows of the LCD panel 920, and thin film transistors (TFTs) connected to the rows (e.g., row electrodes) to which the scan signals have been applied are sequentially turned on. A grayscale voltage (e.g., SL1, SL2 to SLn) may be provided by the data driving unit 910 and may be applied to the LCD panel 920 via the TFTs connected to the row electrodes to which the scan signals have been applied. The grayscale voltage may adjust the amount of transmitted light by controlling the rotational angle of liquid crystal of the LCD panel 920.

Examples of a voltage required to drive the LCD panel 920 may include a source line driving voltage AVDD, which may be a positive voltage higher than an input power supply voltage, and a boosted voltage such as a gate line high voltage $V_{GH}$ and a gate line low voltage $V_{GL}$ which may be a negative voltage lower than a ground voltage. The source line driving voltage AVDD may be used as a voltage for driving a source line of a TFT-LCD pixel, and the gate line high voltage $V_{GH}$ and the gate line low voltage $V_{GL}$ may be used as a voltage for driving a gate line of the TFT-LCD pixel. The charge pump 950 may receive an external supply voltage (e.g., external voltage) and may generate positively boosted voltages (e.g., AVDD and $V_{GH}$), a negatively boosted voltage (e.g., $V_{GL}$, and the like) from the external battery power supply voltage, and may provide the voltages AVDD, $V_{GH}$, $V_{GL}$, and the like to the scan driving unit 940 and the data driving unit 910.

The data driving unit 910 may receive the voltage AVDD from the charge pump 950 and may provide a grayscale voltage corresponding to the received image signal to the LCD panel 920. The scan driving unit 940 may receive the voltages $V_{GH}$ and $V_{GL}$ from the charge pump 950 and may use the voltages $V_{GH}$ and $V_{GL}$ as a voltage for turning on or off the TFTs connected to the row electrodes (e.g., GL1, GL2 to GLn). The charge pump 950 may be one of the positive charge pumps 100 and 300 and the negative charge pumps 400 and 600.

Figure 10:
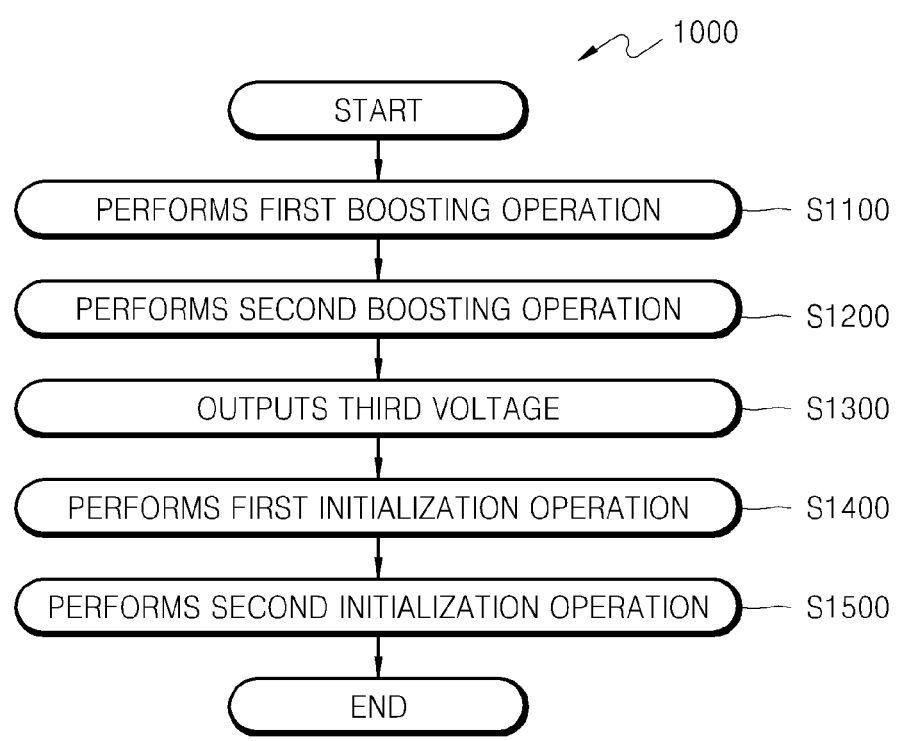

FIG. 10 is a flowchart illustrating a method 1000 of controlling a charge pump, according to example embodiments of inventive concepts.

In step S1110, a first boosting operation may be performed to boost a voltage of a boost node, which may be a first voltage, in response to a clock signal to a second voltage having a voltage level higher than the first voltage by a middle voltage, in response to a first control signal. For example, the boosting includes positive boosting and negative boosting. The second voltage has a voltage level between the first voltage and a third voltage. For example, the middle voltage may be a positive voltage or a negative voltage.

In step S1200, a second boosting operation may be performed to boost the second voltage of the boost node to the third voltage having a voltage level higher than an input voltage by the first voltage in response to a second control signal. In step S1300, an operation of outputting the third voltage in response to the second control signal may be performed.

In step S1400, a first initialization operation may be performed to initialize the voltage of the boost node from the third voltage to the second voltage in response to the first control signal. In step S1500, a second initialization operation may be performed to initialize the voltage of the boost node from the second voltage to the first voltage in response to the clock signal.

The first control signal may be enabled in a non-overlap section in which the clock signal and the second control signal are disabled. In other words, in the non-overlap section, the first boosting operation and the first initialization operation may be performed. The clock signal and the second control signal have different duty ratios such that level transition sections of the clock signal CLK are not overlapped by level transition sections of the second control signal Con2.

A charge pump according to example embodiments of inventive concepts may minimize or reduce unnecessary power consumption caused by parasitic capacitances, thereby stably maintaining a desired voltage level of an output voltage to which the voltage level has been boosted and increasing boosting efficiency.

While example embodiments of inventive concepts have been particularly shown and described with reference to exemplary embodiments thereof, it will be understood by one of ordinary skill in the art that various changes in form and details may be made therein without departing from the spirit and scope of the following claims.

What is claimed is:

1. A charge pump, comprising:
a charge pumping unit configured to boost a first voltage in response to a clock signal, the first voltage being boosted to a second voltage having a voltage level higher than the first voltage by a middle voltage in response to a first control signal, the middle voltage being pre-set and separately applied in response to the first control signal, the first control signal being enabled during a time period in which the clock signal and a second control signal are disabled,
the charge pumping unit configured to boost the second voltage to a third voltage, the third voltage being a voltage level higher than an input voltage by the first voltage, the input voltage being generated in response to the second control signal; and
a first transfer unit configured to output the third voltage in response to the second control signal, wherein the charge pumping unit includes,
a second transfer unit configured to transfer the middle voltage in response to the first control signal,
a third transfer unit configured to transfer the first voltage to a boost node in response to the clock signal during the second initialization of the boost node, and
a pumping capacitor connected between an input node and the boost node, the input node configured to be selectively connected to a power supply voltage source, the middle voltage, or the input voltage, the boost node configured to be selectively connected to an output unit or a power supply voltage source.

2. The charge pump of claim 1, wherein the charge pumping unit is further configured to first initialize the voltage of a boost node from the third voltage to the second voltage in response to the first control signal, and the charge pump unit is configured to second initialize the voltage of the boost node from the second voltage to the first voltage in response to the clock signal.

3. The charge pump of claim 1, wherein the second voltage is a voltage level between the first voltage and the third voltage.

4. The charge pump of claim 1, wherein the clock signal and the second control signal have different duty ratios such that level transition time periods of the clock signal are not overlapped by level transition time periods of the second control signal.

5. The charge pump of claim 1, wherein
the first transfer unit includes,
a first switch configured to transfer the input voltage to the input node in response to the second control signal, and
a second switch configured to transfer the third voltage to the output unit in response to the second control signal,
the second transfer unit includes a middle voltage application switch configured to apply the middle voltage to the input node between the pumping capacitor and the first transfer unit in response to the first control signal, and
the third transfer unit includes,
a fourth switch configured to transfer the ground voltage to the boost node in response to the clock signal, and
a third switch configured to connect the input node to the first voltage.

6. The charge pump of claim 5, wherein the input voltage and the first voltage are ground voltages.

7. The charge pump of claim 1, further comprising:
an output unit configured to receive the third voltage in response to the second signal, the output unit including an output capacitor between an output terminal and a ground terminal.

8. The charge pump of claim 5, wherein the middle voltage application switch includes a plurality of switches configured to apply a plurality of middle voltages.

9. A display driving system, comprising:
the charge pump of claim 1;
a display panel including a plurality of scan lines, a plurality of data lines, a plurality of switching units and plurality of a pixel electrodes, each of the plurality of switching units and the plurality of a pixel electrodes are located at an intersection of the plurality of scan lines and the plurality of data lines;

a scan driving unit configured to apply scan signals to each of the plurality of scan lines, a data driving unit configured to apply grayscale information to each of the plurality of data lines, and a timing controller configured to control the scan driving unit and the data driving unit, wherein the charge pump is configured to apply a driving voltage to at least one of the display panel, the scan driving unit, the data driving unit, and the timing controller.

10. A charge pump comprising:

a first unit charge pump; and a second unit charge pump configured to receive an output voltage of the first unit charge pump as an input voltage, the first unit charge pump and second unit charge pump each including, a charge pumping unit configured to boost a first voltage in response to a clock signal, the first voltage being boosted to a second voltage having a voltage level higher than the first voltage by a middle voltage in response to a first control signal, the middle voltage being present and separately applied in response to the first control signal, the first control signal being enabled during a time period in which the clock signal and a second control signal are disabled and the charge pumping unit configured to boost the second voltage to a third voltage, the third voltage being a voltage level higher than an input voltage by the first voltage, the input voltage being generated in response to the second control signal; and a first transfer unit configured to output the third voltage in response to the second control signal, wherein the charge pumping unit includes, a second transfer unit configured to transfer the middle voltage in response to the first control signal, a third transfer unit configured to transfer the first voltage to a boost node in response to the clock signal during the second initialization of the boost node, and a pumping capacitor connected between an input node and the boost node, the input node configured to be selectively connected to a power supply voltage source, the middle voltage, or the input voltage, the boost node configured to be selectively connected to an output unit or a power supply voltage source.

* * * * *